US011101713B2

(12) United States Patent
Okubo et al.

(10) Patent No.: US 11,101,713 B2
(45) Date of Patent: Aug. 24, 2021

(54) VEHICLE MOTOR

(71) Applicant: Mitsubishi Electric Corporation, Tokyo (JP)

(72) Inventors: Tatsuro Okubo, Tokyo (JP); Hideo Terasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 16/497,025

(22) PCT Filed: Mar. 30, 2017

(86) PCT No.: PCT/JP2017/013360
§ 371 (c)(1),
(2) Date: Sep. 24, 2019

(87) PCT Pub. No.: WO2018/179269
PCT Pub. Date: Oct. 4, 2018

(65) Prior Publication Data
US 2020/0112224 A1 Apr. 9, 2020

(51) Int. Cl.
*H02K 5/20* (2006.01)
*H02K 9/06* (2006.01)
(Continued)

(52) U.S. Cl.
CPC .............. *H02K 5/20* (2013.01); *B61C 3/00* (2013.01); *H02K 5/161* (2013.01); *H02K 9/06* (2013.01);
(Continued)

(58) Field of Classification Search
CPC ............ H02K 5/20; H02K 5/161; H02K 9/06; H02K 17/165; H02K 2205/09; H02K 1/32;
(Continued)

(56) References Cited

U.S. PATENT DOCUMENTS 5,084,641 A * 1/1992 Saima ...................... H02K 9/06
310/51
5,214,324 A 5/1993 Holmes
2011/0298316 A1* 12/2011 Bradfield ................. H02K 5/20
310/58

FOREIGN PATENT DOCUMENTS

AT 123312 B 6/1931
DE 69212996 T2 3/1997
(Continued)

OTHER PUBLICATIONS

Office Action dated Nov. 4, 2020, by the German Patent Office in corresponding German Patent Application No. 112017007359.6 and English translation of the Office Action. (14 pages).
(Continued)

*Primary Examiner* — Thomas Truong
(74) *Attorney, Agent, or Firm* — Buchanan Ingersoll & Rooney PC

(57) ABSTRACT

A vehicle motor is equipped with a downwind side air guiding member to guide air, flowing in from a suction port formed in an end of a frame at a first bracket side, through a stator ventilating path, into contact with an end portion of a stator coil, along the stator coil from an end portion of the stator coil, and then toward a stator core, and then to an exhaust port formed in a second bracket side of the frame end portion or in a second bracket.

20 Claims, 27 Drawing Sheets

(51) Int. Cl.
    *B61C 3/00*         (2006.01)
    *H02K 5/16*         (2006.01)
    *H02K 17/16*       (2006.01)

(52) U.S. Cl.
    CPC ....... *H02K 17/165* (2013.01); *H02K 2205/09* (2013.01)

(58) Field of Classification Search
    CPC .......... H02K 1/20; H02K 5/1732; H02K 5/15; B61C 3/00
    USPC ........................................ 310/58, 59, 62, 63
    See application file for complete search history.

(56) References Cited

FOREIGN PATENT DOCUMENTS

| JP | S53-085307 A | 7/1978 |
|---|---|---|
| JP | S56103949 A | 8/1981 |
| JP | S62-250842 A | 10/1987 |
| JP | S62-268335 A | 11/1987 |
| JP | S63043547 A | 2/1988 |
| JP | H02-097251 A | 4/1990 |
| JP | H07241059 A | 9/1995 |
| JP | H11-146605 A | 5/1999 |
| JP | 2004350474 A | 12/2004 |
| JP | 2008295286 A | 12/2008 |

OTHER PUBLICATIONS

International Search Report (PCT/ISA/210) and translation and Written Opinion (PCT/ISA/237) dated Jun. 20, 2017, by the Japanese Patent Office as the International Searching Authority for International Application No. PCT/JP2017/013360.

Office Action and translation dated Sep. 3, 2019, by the Japanese Patent Office for Application No. 2019-508050.

* cited by examiner

VEHICLE MOTOR

TECHNICAL FIELD

The present disclosure relates to a vehicle motor.

BACKGROUND ART

A squirrel cage type induction motor is used as a main motor for driving an electric railway vehicle. A squirrel cage shaped rotor conductor of the squirrel cage type induction motor is formed by inserting rod-shaped rotor bars into grooves that extend in an axial direction of a rotor shaft and are formed at an outer periphery side of a rotor core, and bonding-attaching short-circuit rings that are ring shaped conductors to both ends of the rotor bars. A rotating magnetic field is generated by flow of alternating electric current in the stator coil provided in the groove formed in a stator core. An induced voltage is generated due to the squirrel cage rotor conductor coupling with the rotating magnetic field. Due to the induced voltage, induction current flows in the squirrel cage type rotor conductor forming a closed path, and magnetic poles are generated in the rotor core. Due to interaction between the magnetic poles of the rotor core and magnetic poles of the rotating magnetic field, a force in the peripheral surface-tangential direction is generated in the rotor core to form output torque of the rotor shaft.

Due to the flow of currents in the stator coil and the rotor conductor, a copper loss occurs that corresponds to a product of resistance of the conductor and a square of the current value, and temperatures of the stator coil and the rotor conductor rise. Magnetic flux generated by the currents flowing through the stator coil and the rotor conductor pass through the stator core and the rotor core. Due to changes in the direction of the magnetic flux passing through the stator core and the rotor core, iron losses occur, and the temperatures of the stator core and the rotor core rise. When a high frequency component is present in the voltage and current supplied to the main motor, a high frequency loss occurs, and the temperatures of the stator coil, the rotor conductor, the stator core, and the rotor core rise. In the aforementioned manner, the internal temperature of the main motor rises due to various types of losses during operation of the main motor. In order to cool the interior of the main motor, a self-ventilating type main motor having a fan attached to the rotor shaft, and a forced air-cooled type main motor in which cooling blown air sent from an external air blower is taken into the interior, are internally cooled by internal ventilation of the main motor by outside air.

In the self-ventilating type main motor, the fan is attached to the rotor shaft of the main motor, and at a side of the iron core opposite to the fan, a suction port is formed for inflow of air exterior to a housing, and an exhaust port for discharging the inflow air is formed at an outer peripheral side of the fan. The fan rotates together with rotation of the rotor during operation of the main motor, and thus a pressure difference occurs between an outer peripheral side and an inner peripheral side of the blades of the fan. Due to the pressure difference, the air that flows in from the suction port passes through the ventilating path formed in the rotor core and through the gap between the rotor core and the stator core, and then is discharged from the exhaust port. The interior of the main motor is cooled by the air flowing in from the suction port.

In the case of the forced air-cooled type main motor, the blower is provided at the exterior of the main motor. The exterior air passes through a duct connecting from the blower to the main motor, and thus is forcefully made to flow into the interior from the suction port of the main motor. In the same manner as the self-ventilating type main motor, the inflowing air passes through the ventilating path and the gap between the rotor core and the stator core, and is discharged from the exhaust port. The forced air-cooled type main motor is not equipped with a cooling fan. During operation of the blower, air always flows into the interior of the main motor, regardless of whether the rotor is rotating, and the interior of the main motor is cooled.

In a ventilation cooling structure of a vehicle rotary electric machine disclosed in Patent Literature 1, cooling blown air introduced into an interior of a motor from an introduction port is divided by an adjustment plate. One portion of the cooling blown air cools an upwind side stator coil, passes through a cooling gap formed between the stator core and the rotor core and an air hole formed in the stator core, cools the stator core and the rotor core, and further cools the rotor bars and the short-circuit rings. Thereafter, the cooling blown air is discharged from an air discharging port. The other portion of the cooling blown air passes through a bypass passage provided outside the stator, is directly introduced by the introduction port to a downwind side stator coil, and cools the stator coil. Thereafter, the cooling blown air passes between the stator coils, cools the rotor bars and the short-circuit rings, and then is discharged from the air discharging port.

In a rotary electric machine disclosed in Patent Literature 2, a fan guide is provided. A part above an axis center of the fan guide causes air introduced from an upper side air intake port, by hitting an interior side surface of a stator coil end, to be discharged to the exterior from an upper side air discharge port and to be introduced so as not to go to an airflow passage provided at an outer periphery of the stator. A part below the axis center of the fan guide causes air introduced from a lower side air intake port to pass through an outside surface from an inside surface of the stator coil end, and guides the air to the air flow passage.

CITATION LIST

Patent Literature

Patent Literature 1: Unexamined Japanese Patent Application Kokai Publication No. S63-043547

Patent Literature 2: Unexamined Japanese Patent Application Kokai Publication No. H07-241059

SUMMARY OF INVENTION

Technical Problem

The vehicle rotary electric machine disclosed in Patent Literature 1 is mounted on a railway vehicle. Moreover, the rotary electric machine disclosed in Patent Literature 2 is a rotary electric machine suitable for a generic induction motor of comparatively small volume. In the bogie with which the railway vehicle is equipped, attachment space for attachment of the railway vehicle main motor is limited by rail width, other onboard equipment, or the like, and thus size and weight reduction of the main motor are desired. Moreover, increasingly high main motor output is desired for the railway vehicle main motor. Therefore, energy density of the railway vehicle main motor and the heat resistance class of the insulation material used in the main motor are high in comparison to a general industrial motor. The railway vehicle main motor is operated under conditions in which the temperatures of the stator coil and the rotor conductor are high in comparison to the general industrial motor. In order to suppress excessive heating of the stator coil and the rotor conductor, means are used such as lowering generation loss by increasing the frame of the main motor within the attachment space, increasing the cooling air flow amount, or the like. However, increasing the frame of the main motor results in increase in the mass of the motor, and thus the response to the desire for high output and size/weight reduction becomes difficult.

Moreover, for example, the output of the high-speed railway vehicle main motor mounted on the "bullet train" has higher output than the main motors mounted on suburban electric trains, subway cars, or the like. The high-speed railway vehicle main motor is thus not the self-ventilating type motor, but rather is the forced air-cooled type motor that performs cooling by use of the external air blower. Even for the high-speed railway vehicle main motor, size and weight reduction are desired for railway vehicle speed increase, improvement of traveling stability, or the like.

In consideration of the aforementioned circumstances, an objective of the present disclosure is to improve internal cooling performance of a vehicle motor.

Solution to Problem

In order to attain the aforementioned objective, a vehicle motor of the present disclosure includes a frame, a rotor shaft, a rotor core, a rotor conductor, a stator core, a stator coil, a first bracket, a second bracket, and a downwind side air guiding member. The frame is fixed to the vehicle. The rotor shaft is housed in the frame. The rotor core engages the rotor shaft and integrally rotates with the rotor shaft. The rotor core holds the rotor conductor. The stator core opposes an outer peripheral surface of the rotor core across a gap, and is attached to an inner peripheral surface of the frame. Multiple stator ventilating paths are formed extending in the axial direction of the rotor shaft within the stator core. The stator coil is held by the stator core further at an inner periphery side than the stator ventilating paths in a state in which both end portions protrude from the stator core in the axial direction of the rotor shaft. The first bracket and the second bracket oppose each other in the axial direction of the rotor shaft and sandwich therebetween the rotor core and the stator core, and each bracket holds a bearing rotatably supporting the rotor shaft. The first bracket and the second bracket are attached to the frame. Air flowing in from the suction port formed in the first bracket-side end of the frame passes through the stator ventilating path, then is contacted with one of the end portions of the stator coil, and is guided by the downwind side air guiding member toward the stator core along the stator coil from the end portion of the stator coil, and thereafter to an exhaust port formed in the second bracket or in an end portion of the frame at a second bracket side.

Advantageous Effects of Invention

According to the present disclosure, air flowing in from the suction port and passing through the stator ventilating path is made to contact the end portion of the stator coil, and is guided by the downwind side air guiding member along the stator coil from the end portion of the stator coil toward the stator core, and then to the exhaust port, thereby enabling increase in the internal cooling performance of the vehicle motor.

DESCRIPTION OF EMBODIMENTS

Figure 1:
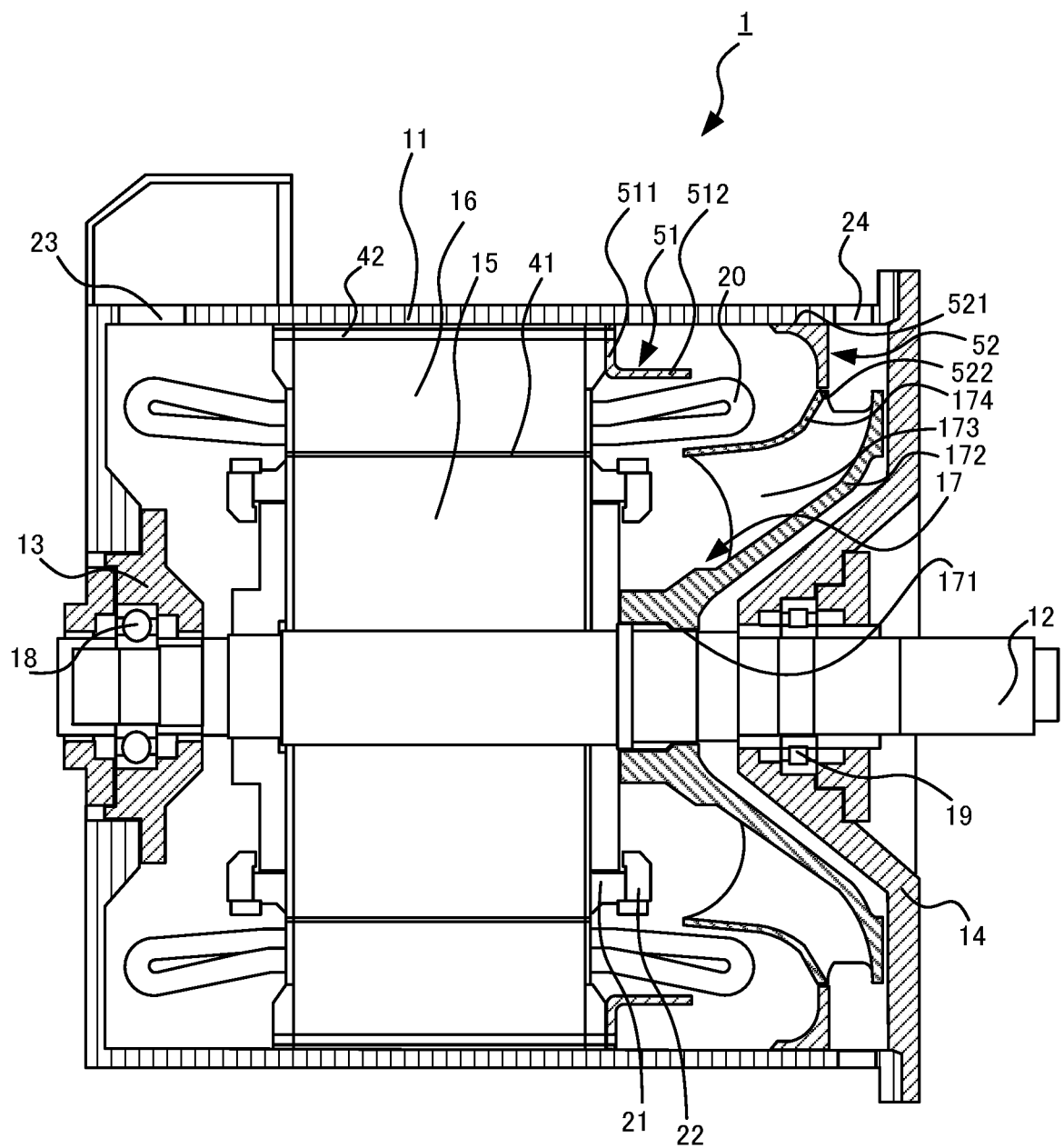
FIG. 1 is a cross-sectional view of a vehicle motor according to Embodiment 1 of the present disclosure.
Figure 1:
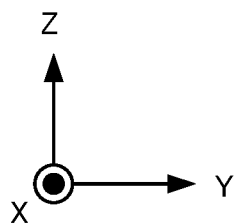

Embodiments of the present disclosure are described below in detail with reference to drawings. In the drawings, components that are the same or equivalent are assigned the same reference sign.

Embodiment 1

FIG. 1 is a cross-sectional view of a vehicle motor according to Embodiment 1 of the present disclosure. FIG. 1 is a cross-sectional view taken along a plane parallel to a rotor shaft 12. A vehicle motor 1 is equipped with: a frame 11 fixed to a vehicle, the rotor shaft 12 contained in the frame 11, a first bracket 13 and a second bracket 14 fixed to the frame 11, a rotor core 15 engaging the rotor shaft 12, a stator core 16 attached to an inner peripheral surface of the frame 11, and a fan 17 attached to the rotor shaft 12. A Z axis is the vertical direction, an X axis is in the direction of travel of the vehicle on which the vehicle motor 1 is mounted, and a Y axis is the direction perpendicular to the X axis and the Z axis. In the case in which the vehicle motor 1 is fixed to a body of the vehicle, for example, an axial direction of the rotor shaft 12 is the X axis direction; and in the case in which the vehicle motor 1 is fixed to a bogie of the vehicle, for example, the axial direction of the rotor shaft 12 is the Y axis direction. The vehicle motor 1, for example, is mounted on an electric railway vehicle. The directions of the X axis, Y axis, and Z axis illustrated in FIG. 1 and beyond indicate the directions in the case in which the vehicle motor 1 is fixed to the bogie of the vehicle.

The first bracket 13 and the second bracket 14 oppose each other in the Y axis direction and sandwich the rotor core 15 and the stator core 16 therebetween. The first bracket 13 and the second bracket 14 respectively hold bearings 18 and 19 that rotatably support the rotor shaft 12, and are attached to the frame 11. At the end portion of the frame 11 at the first bracket 13 side, a suction port 23 is formed for inflow of air from the exterior of the frame 11. In FIG. 1, although the suction port 23 is formed in the surface of the vertical direction top side of the frame 11, the position of formation of the suction port 23 is not limited to that of the example of FIG. 1. The suction port 23 may be formed in the end surface, to which the first bracket 13 is attached, of the frame 11 perpendicular to the axis of the rotor shaft 12. An exhaust port 24 is formed at the second bracket 14 side end portion of the frame 11. In FIG. 1, the exhaust port 24 is formed in the second bracket 14-side end portion of the frame 11, the second bracket 14 that opposes the fan 17.

The rotor core 15 engages the rotor shaft 12 and integrally rotates with the rotor shaft 12. The rotor core 15 holds a rotor conductor that has rotor bars 21 and short-circuit rings 22. The rotor bars 21 are inserted in grooves formed in the outer peripheral side of the rotor core 15 and extend in the axial direction of the rotor shaft 12. Both end portions of the rotor bars 21 are joined to short-circuit rings 22 that are shaped as ring-shaped conductors in cross section perpendicular to the Y axis direction so that the rotor bars 21 are electrically connected to each other. The stator core 16 opposes the outer peripheral surface of the rotor core 15 with a gap therebetween. The gap between the inner peripheral face of the stator core 16 and the outer peripheral surface of the rotor core 15 is an inter-iron core gap 41. Multiple stator ventilating paths 42 are formed in the stator core 16 and extend in the axial direction of the rotor shaft 12. In the state in which both end portions protrude in the axial direction of the rotor shaft 12 from the stator core 16, the stator coil 20 is held by the stator core 16 further at an inner peripheral side than the stator ventilating paths 42.

Figure 2:
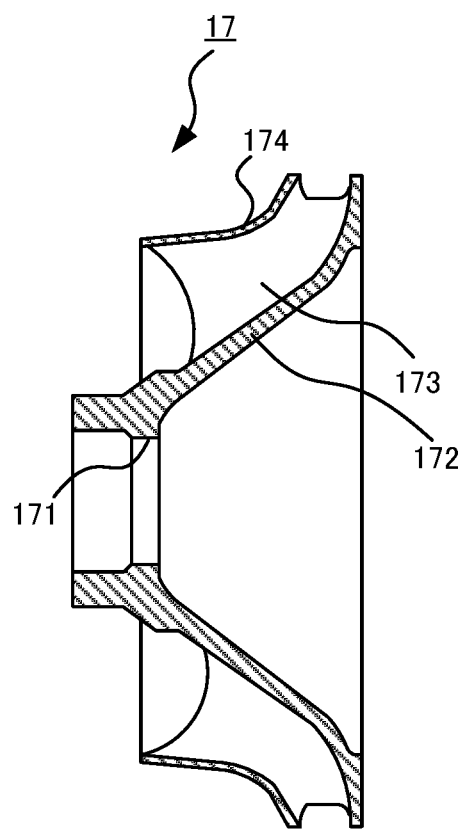
FIG. 2 is a cross-sectional view of a fan according to Embodiment 1.

FIG. 2 is a cross-sectional view of the fan according to Embodiment 1. The fan 17 is attached to the rotor shaft 12 at a position opposing the second bracket 14. A shaft-fitting member 171 is an inner peripheral part of the fan 17 and engages the rotor shaft 12, thereby attaching the fan 17 to the rotor shaft 12. The fan 17 integrally rotates with the rotor shaft 12. A main plate 172 extends from the shaft-fitting member 171 to an outer peripheral end of the fan 17. Multiple blades 173 are attached to the main plate 172. A side plate 174 is provided over the entire circumference of the blades 173 at a side thereof opposite to the main plate 172. Multiple fan ventilating paths are formed by the main plate 172, the blades 173, and the side plate 174. When the fan 17 rotates, a pressure difference occurs between the outer peripheral side and the inner peripheral side of the blades 173 due to centrifugal force of air within the fan ventilating paths. Air flows into the interior of the vehicle motor 1 from the suction port 23 due to the pressure difference.

A portion of the air flowing into the interior of the vehicle motor 1 arrives at the stator ventilating path 42. The vehicle motor 1 is equipped with a downwind side air guiding member that, after the air flowing in from the suction port 23 and passing through the stator ventilating path 42 contacts the end portion of the stator coil 20, guides the air toward the stator core 16 along the stator coil 20 from the end portion of the stator coil 20, then to the exhaust port 24. In the vehicle motor 1, the downwind side air guiding member has a first air guiding member 51 and a second air guiding member 52.

Figure 3:
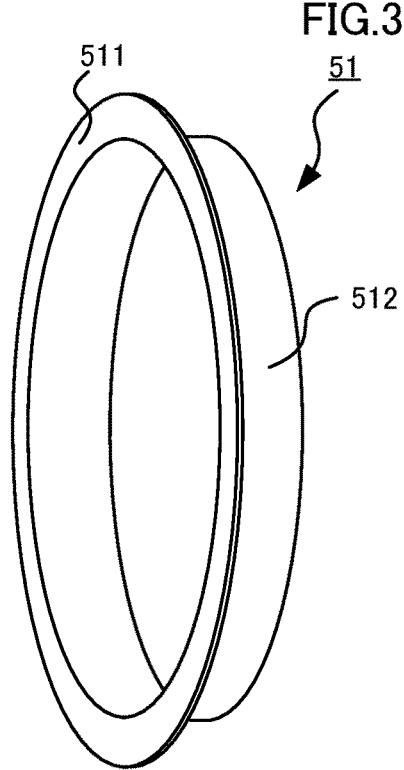
FIG. 3 is a perspective view of a first air guiding member according to Embodiment 1.
Figure 4:
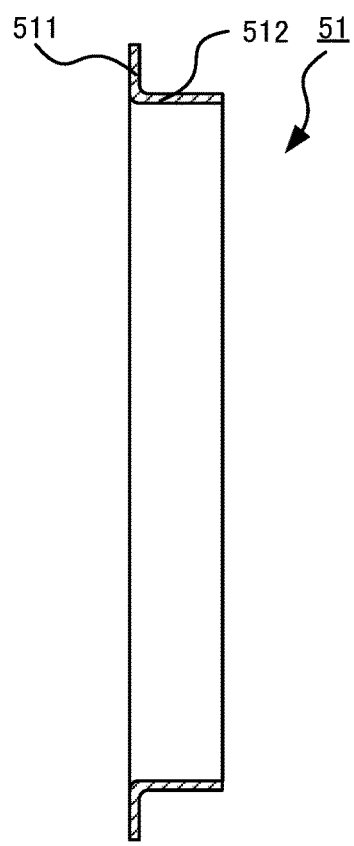
FIG. 4 is a cross-sectional view of the first air guiding member according to Embodiment 1.

FIG. 3 is a perspective view of the first air guiding member according to Embodiment 1. FIG. 4 is a cross-sectional view of the first air guiding member according to Embodiment 1. The shape of the cross section of the first air guiding member 51 perpendicular to the Y axis is annular. As illustrated in FIG. 1, one Y axis direction end portion of the first air guiding member 51 contacts the stator core 16. A fastening member 511 that is this end portion, and that is illustrated in FIGS. 3 and 4, is fastened to the stator core 16. A non-illustrated ventilation hole opposing an opening of the stator ventilating path 42 is formed in the fastening member 511. A flow path is formed between the inner peripheral surface of the frame 11 and a cylindrical part 512 that has a cylindrical shape extending in the Y axis direction of the first guiding member 51. A portion of the side plate 174 that is the outer peripheral surface of the fan 17 opposes a portion of the cylindrical part 512 of the first air guiding member 51 with the stator coil 20 being sandwiched therebetween. The air passing through the stator ventilating path 42 is guided by the first air guiding member 51 between the cylindrical part 512 and the inner peripheral surface of the frame 11, and toward the end portion of the stator coil 20. During attachment of the first air guiding member 51 to the stator core 16, in order to prevent contact with a non-illustrated ring that fastens the stator coil 20, fastening members 511 of a set of half-annular shaped first air guiding members 51 are each fastened to the stator core 16. Fastening of the first air guiding members 51 to the stator core 16 is performed prior to engaging of the stator core 16 with the inner peripheral surface of the frame 11.

Figure 5:
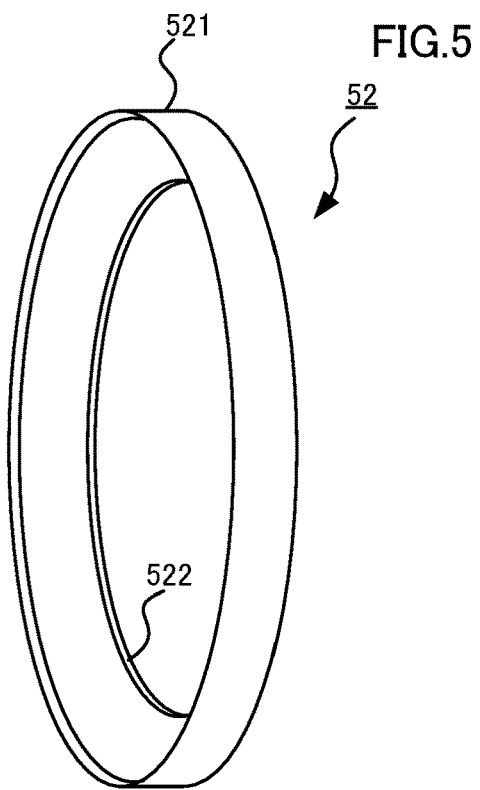
FIG. 5 is a perspective view of a second air guiding member according to Embodiment 1.
Figure 6:
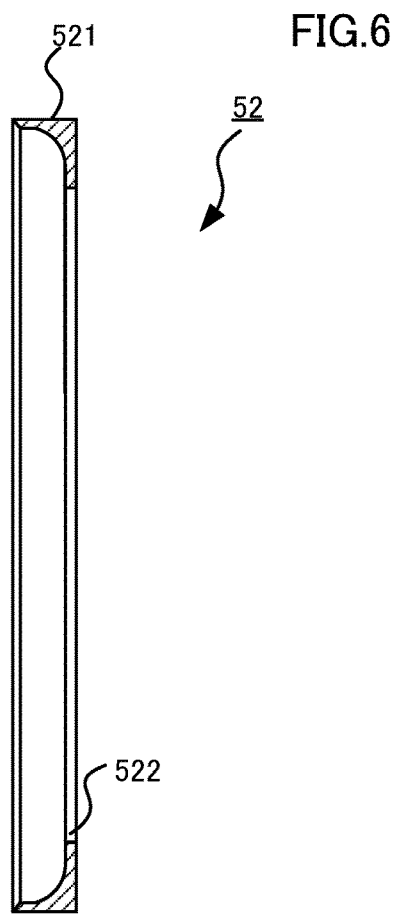
FIG. 6 is a cross-sectional view of the second air guiding member according to Embodiment 1.

FIG. 5 is a perspective view of the second air guiding member according to Embodiment 1. FIG. 6 is a cross-sectional view of the second air guiding member according to Embodiment 1. Shape of the cross section perpendicular to the Y axis of the second air guiding member 52 is annular. The outer peripheral surface of the second air guiding member 52 contacts the inner peripheral surface of the frame 11. The second air guiding member 52 is engaged with the inner peripheral surface of the frame 11 by a fitting member 521. As illustrated in FIG. 1, the second air guiding member 52 extends from the inner peripheral surface of the frame 11 toward an end portion of the side plate 174 in the vicinity of the exhaust port 24. A side plate opposing member 522 of the second air guiding member 52 opposes the end portion of the side plate 174 in the vicinity of the exhaust port 24. Moreover, as illustrated in FIG. 1, a portion of the fitting member 521 is adjacent to the stator core 16 side of the exhaust port 24. The air contacted with the end portion of the stator coil 20 is guided by the second air guiding member 52 and the side plate 174 toward the stator core 16 from the end portion of the stator coil 20. Moreover, the second air guiding member 52 guides the air discharged from the fan 17 to the exhaust port 24.

Figure 7:
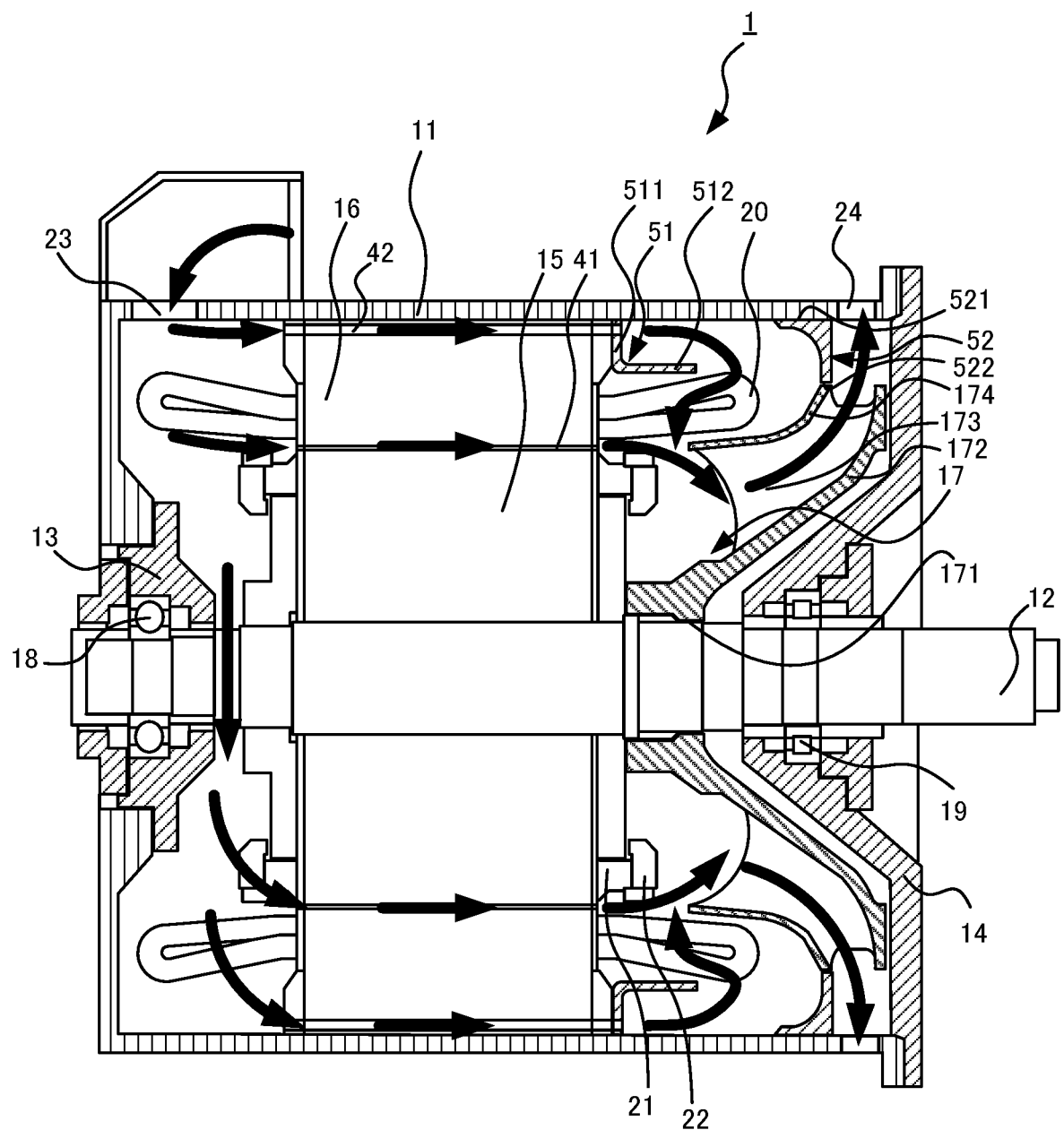
FIG. 7 is a drawing illustrating flow of air occurring in the vehicle motor according to Embodiment 1.

FIG. 7 is a drawing illustrating flow of air occurring in the vehicle motor according to Embodiment 1. FIG. 7 is a drawing that illustrates by bold arrows the flow of air occurring in the vehicle motor 1 illustrated in FIG. 1. The rotor shaft 12 rotates during operation of the vehicle motor 1. Together with the rotation of the rotor shaft 12, the fan 17 engaged to the rotor shaft 12 also rotates. Due to rotation of the fan 17, air flows in from the suction port 23. In the example of FIG. 7, air exterior to the vehicle motor 1 passes through the suction port 23 and flows into the interior of the vehicle motor 1. A portion of the air that flows into the interior of the vehicle motor 1 arrives at the stator ventilating path 42. The air passed through the stator ventilating path 42 passes through the flow path between the outer peripheral surface of the cylindrical part 512 of the first air guiding member 51 and the inner peripheral surface of the frame 11, and contacts the end portion of the stator coil 20.

Due to making the gap between the side plate 174 of the fan 17 and the stator coil 20 less than or equal a threshold, the side plate 174 of the fan 17 and the stator coil 20 are adjacent to each other. The threshold is determined in accordance with cooling performance desired for the vehicle motor 1. Due to providing of the second air guiding member 52, and due to the side plate 174 of the fan 17 being adjacent to the inner peripheral surface of the stator coil 20, the air contacted with the end portion of the stator coil 20 flows toward the stator core 16 along the stator coil 20 and arrives at an entrance part of the fan 17. Moreover, another portion of the air flowing into the interior of the vehicle motor 1 passes through the inter-iron core gap 41 and arrives at the entrance part of the fan 17. The air discharged from the fan 17 passes through the flow path between the second air guiding member 52 and the second bracket 14, and is discharged from the exhaust port 24. Due to providing of the second air guiding member 52, the air discharged from the fan 17 is prevented from again arriving at the end portion of the stator coil 20.

In the aforementioned manner, the first air guiding member 51 and the second air guiding member 52 are provided, and the side plate 174 of the fan 17 and the stator coil 20 are adjacent to each other, and thus the air passing through the stator ventilating path 42 passes through the flow path between the cylindrical part 512 of the first air guiding member 51 at the outer peripheral side of the stator coil 20 and the side plate 174 of the fan 17 at the inner peripheral side, and the distance of the flow path through which the air flows while contacting the stator coil 20 is longer than the case of a below described general self-ventilating type motor. The heat transfer coefficient is to be increased for improvement of cooling efficiency. That is to say, the air flow velocity of the air flowing while contacting the high temperature stator coil 20 is to be increased, and surface area of the stator coil 20 contacting the flow of air is to be increased. Due to the flow of air between the first air guiding member 51 and the side plate 174 of the fan 17 in accordance with the vehicle motor 1 of Embodiment 1, the air flow velocity increases locally at locations of contact with the stator coil 20. Moreover, due to lengthening of the distance of the flow path through which the air flows while contacting the stator coil 20, the surface area of the stator coil 20 contacting the flow of air increases. This increases the heat transfer coefficient occurring at the stator coil 20.

Figure 8:
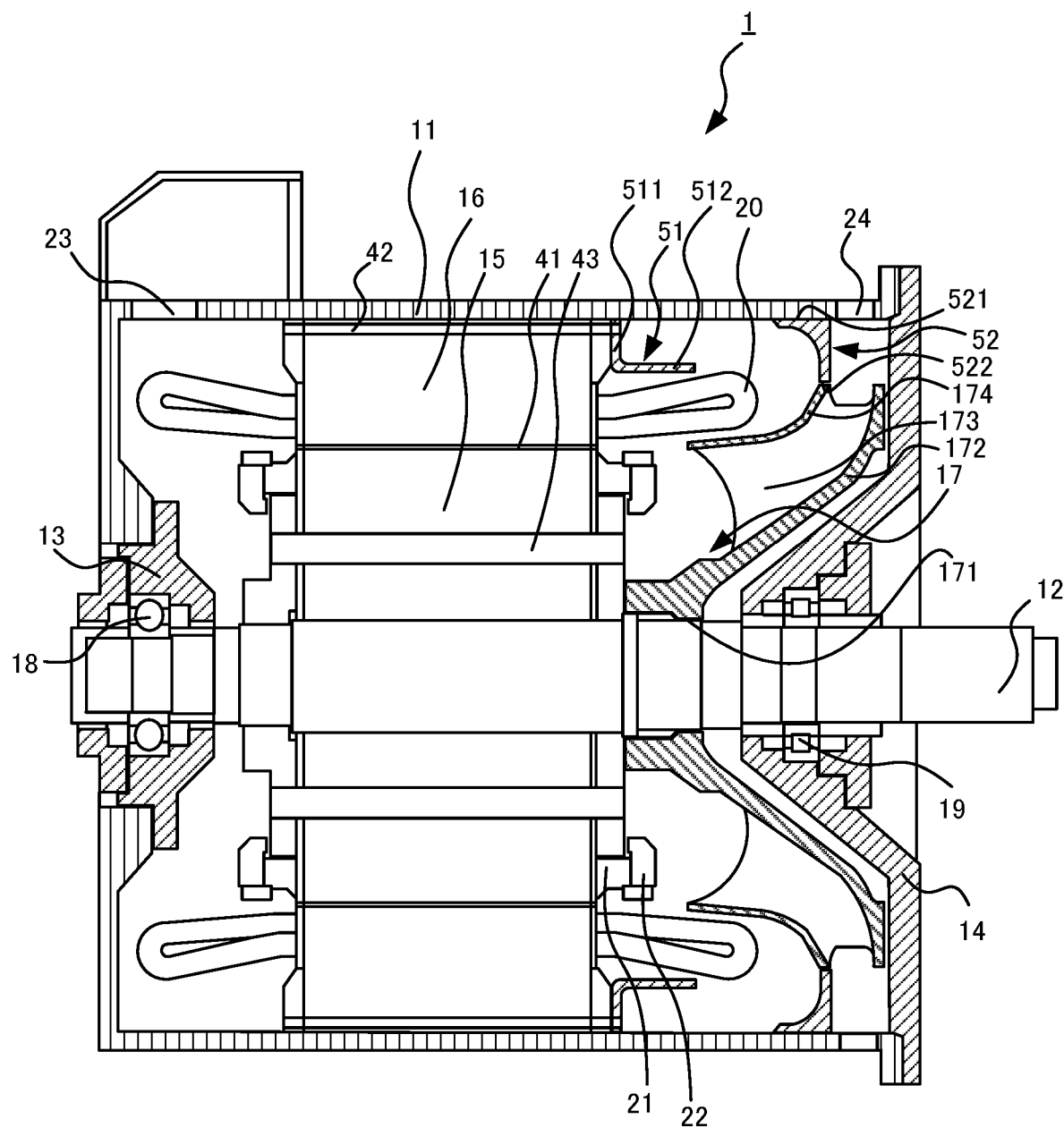
FIG. 8 is a cross-sectional view of the vehicle motor according to Embodiment 1.
Figure 9:
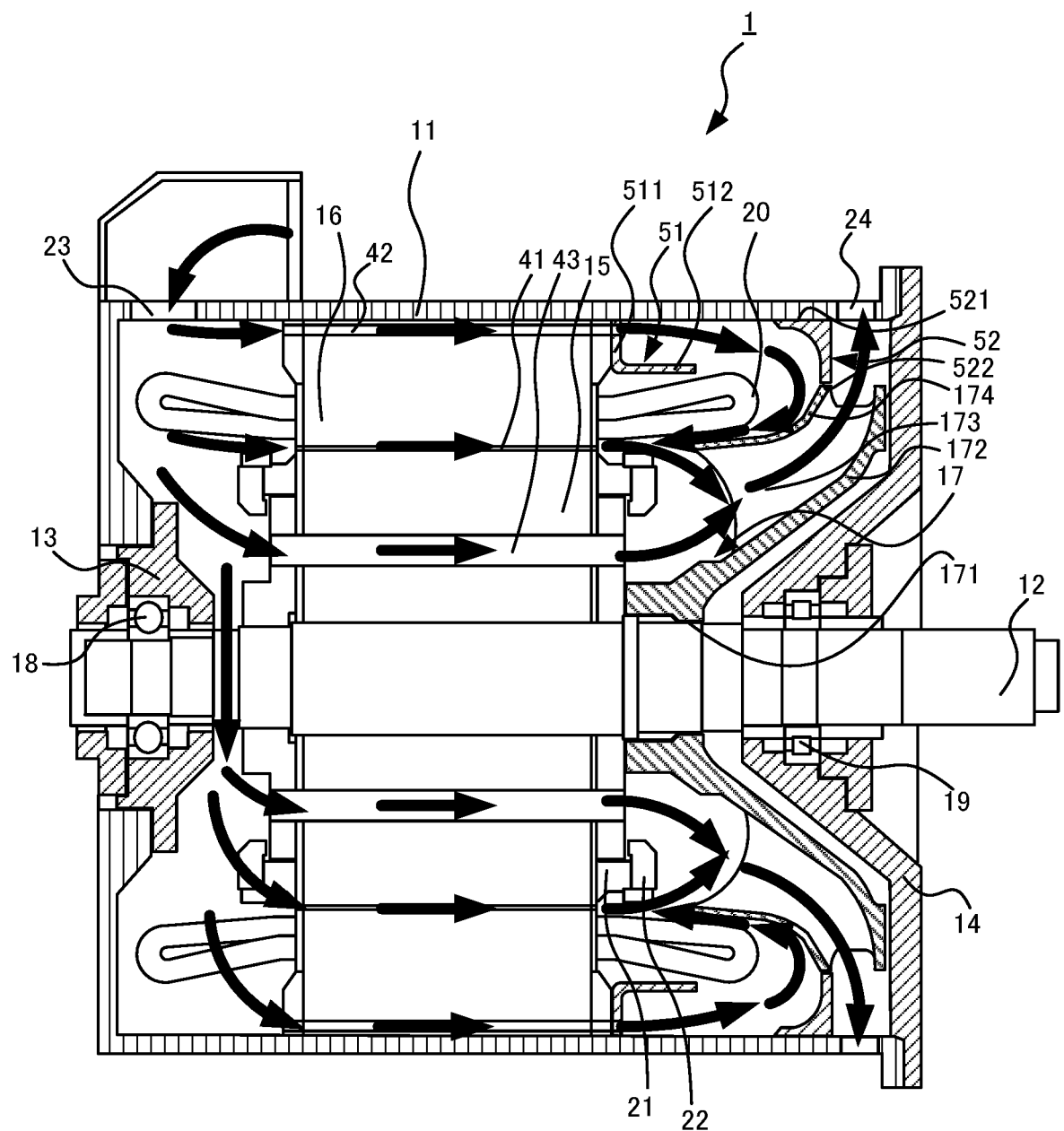
FIG. 9 is a drawing illustrating flow of air occurring in the vehicle motor according to Embodiment 1.

In FIGS. 1 and 7, the vehicle motor 1 has two types of ventilating paths, that is to say, has the inter-iron core gap 41 and the stator ventilating path 42. In the vehicle motor 1, a ventilating path may also be formed in the rotor core 15. FIG. 8 is a cross-sectional view of the vehicle motor according to Embodiment 1. In the vehicle motor 1 illustrated in FIG. 8, a rotor ventilating path 43 is formed in the rotor core 15 and extends in the axial direction of the rotor shaft 12. In FIG. 8, the vehicle motor 1 has three types of ventilating paths, that is to say, the inter-iron core gap 41, the stator ventilating path 42, and the rotor ventilating path 43. FIG. 9 is a drawing illustrating flow of air occurring in the vehicle motor according to Embodiment 1. This drawing is viewed in a manner similar to that of FIG. 7. In the example of FIG. 9, a portion of the air flowing into the interior of the vehicle motor 1 passes through the rotor ventilating path 43 and arrives at the fan 17. In the case in which the rotor ventilating path 43 is provided, a total surface area of a cross section of rotor ventilating paths 43 perpendicular to the Y axis direction is made within a determined range. This range can be determined in accordance with cooling performance desired for the vehicle motor 1.

Figure 10:
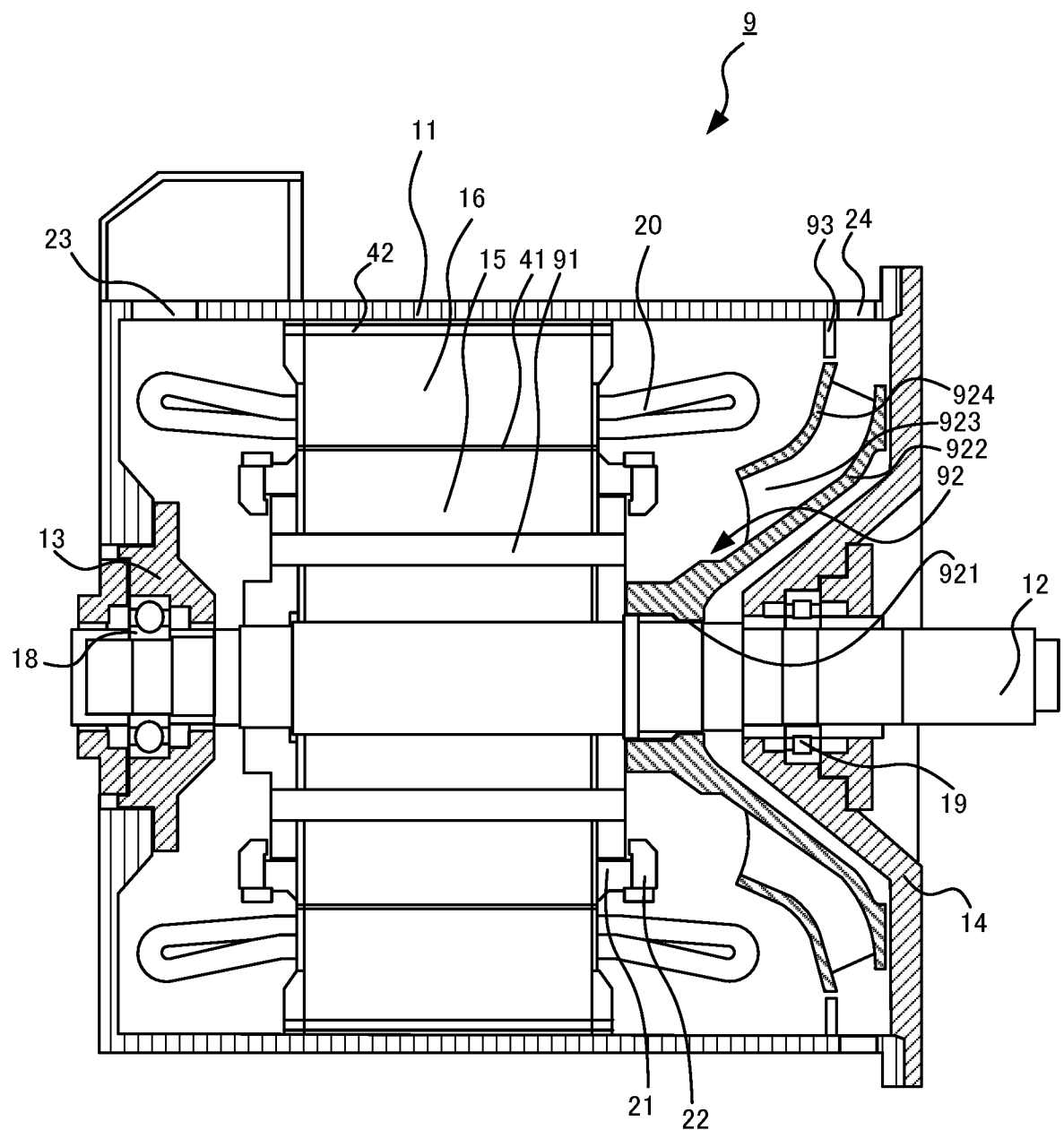
FIG. 10 is a cross-sectional view of a vehicle motor.

FIG. 10 is a cross-sectional view of a vehicle motor. A vehicle motor 9 illustrated in FIG. 10 is a general self-ventilating type motor. Differences with respect to the vehicle motor 1 are described as follows. Rotor ventilating paths 91 extending in the Y axis direction are formed in the rotor core 15. The rotor ventilating paths 91 are provided over the entire circumference at determined intervals in the circumferential direction. The vehicle motor 9 is equipped with a fan 92. In a manner similar to that of the fan 17 of the vehicle motor 1 according to Embodiment 1, the fan 92 engages the rotor shaft 12 by a shaft-fitting member 921. Multiple blades 923 are provided for a main plate 922 included in the fan 92. A side plate 924 is provided over an entire circumference at a side of the blades 923 opposite to the main plate 922. A partition plate 93 is provided that extends from the inner peripheral surface of the frame 11 toward an end portion of the side plate 924 in the vicinity of the exhaust port 24. A gap between the side plate 924 and the stator coil 20 is wide in comparison to the gap between the side plate 174 and the stator coil 20. Moreover, a rotor core 15 side end portion of the side plate 924 is positioned farther from the rotor core 15 in comparison to the rotor core 15 side end portion of the side plate 174.

Figure 11:
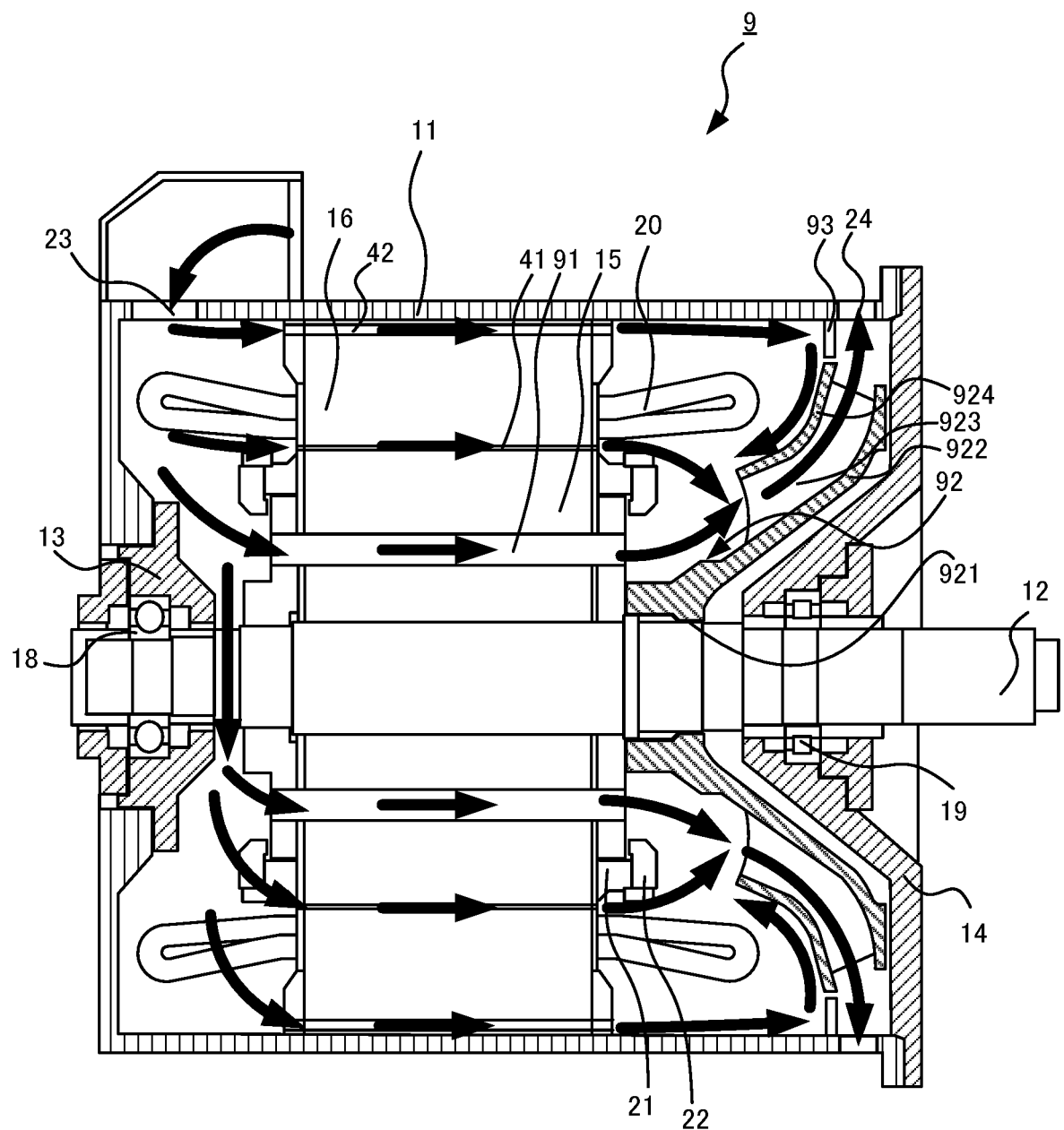
FIG. 11 is a drawing illustrating flow of air occurring in the vehicle motor.
Figure 11:
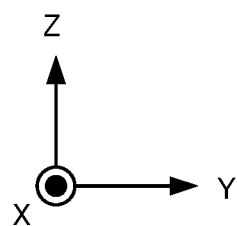

FIG. 11 is a drawing illustrating flow of air occurring in the vehicle motor. This drawing is viewed in a manner similar to that of FIG. 7. In a manner similar to that of the vehicle motor 1 illustrated in FIG. 8, the vehicle motor 9 has three types of ventilating paths, that is to say, has the inter-iron core gap 41, the stator ventilating path 42, and the rotor ventilating path 91. The rotor ventilating paths 91 are provided over the entire circumference at predetermined intervals in the circumferential direction, and thus total surface area of the cross section of the rotor ventilating paths 91 perpendicular to the Y axis direction is larger than the total surface area of the cross section of the rotor ventilating paths 43 perpendicular to the Y axis direction. The air flow amount of air flowing through the rotor ventilating paths 91 is thus greater than the air flow amount of air flowing through the rotor ventilating paths 43. However, the air flow amount of air flowing through the inter-iron core gap 41 occurring in the vehicle motor 9 is less than the air flow amount of air flowing through the inter-iron core gap 41 occurring in the vehicle motor 1. Due to the vehicle motor 9 not being equipped with the first air guiding member 51 and the second air guiding member 52 unlike the vehicle motor 1, a majority of the air passing through the stator ventilating path 42 flows along the inner peripheral surface of the frame 11, the partition plate 93, and the side plate 924.

Figure 12:
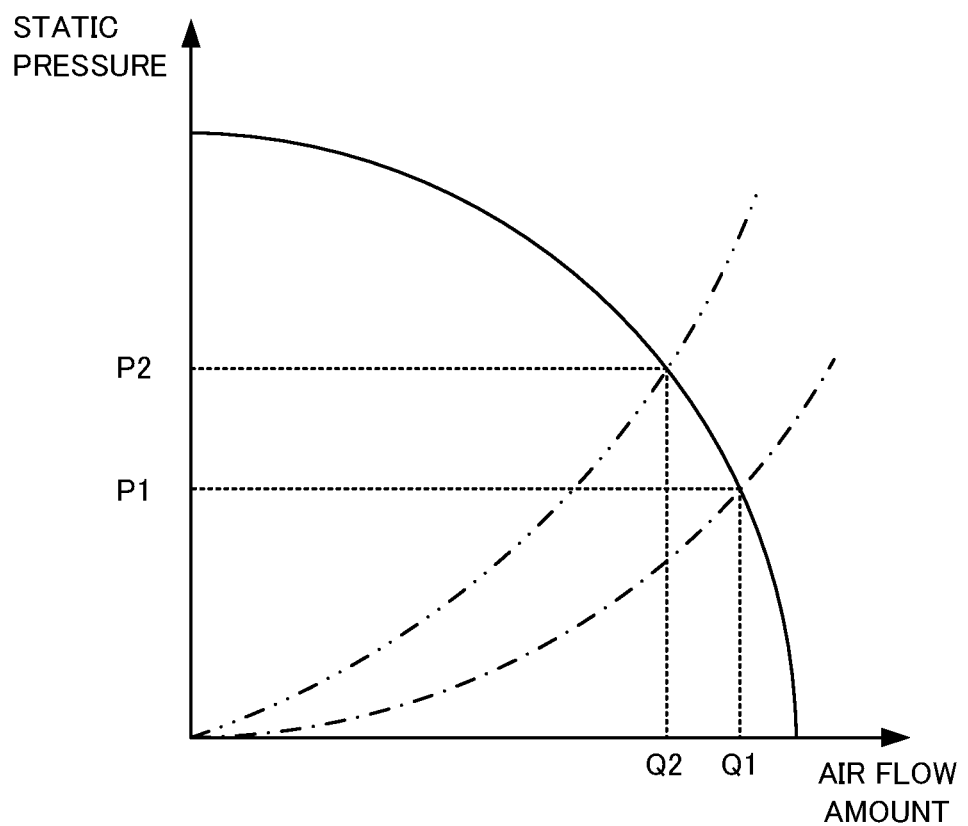
FIG. 12 is a drawing illustrating an example of fan characteristics and pressure loss characteristics.

FIG. 12 is a drawing illustrating an example of fan characteristics and pressure loss characteristics. The horizontal axis indicates the air flow amount of the fan, and the vertical axis indicates static pressure of the fan. The solid line plot in FIG. 12 indicates fan characteristics indicating the relationship between air flow amount and static pressure of the fans 17 and 92. Due to change of the fan characteristics upon change of the rotation rate of the vehicle motors 1 and 9, the rotation rate is taken to be in a fixed state for comparison of the pressure losses and the air flow amount occurring in the vehicle motors 1 and 9. In FIG. 12, overall pressure loss characteristics of the entire ventilating path of the interior of the vehicle motor 9 are indicated by the single dot-dashed line. In FIG. 12, overall pressure characteristics of the ventilating path of the interior of the vehicle motor 1 are indicated by the double dot-dashed line. The vehicle motor 1 is equipped with the first air guiding member 51 and the second air guiding member 52, and the gap between the side plate 174 and the stator coil 20 is narrower than the gap between the side plate 924 and the stator coil 20. Thus the downwind side flow path that is the flow path after leaving the stator ventilating path 42 until arriving at the exhaust port 24 in the vehicle motor 1 is more complex than the downwind side flow path of the vehicle motor 9, and ventilation cross-sectional area in the vicinity of the end portion of the stator coil 20 of the vehicle motor 1 is smaller than in the case of the vehicle motor 9. Moreover, the total surface area of the cross section of the rotor ventilating paths 43 perpendicular to the Y axis is smaller than the total surface area of the cross section of the rotor ventilating paths 91 perpendicular to the Y axis. Therefore, in the case in which the air flow amount is the same in the vehicle motors 1 and 9, the pressure loss occurring in the vehicle motor 1 is larger than for the vehicle motor 9.

In the example of FIG. 12, an air flow amount of the vehicle motor 9 is Q1, and static pressure is P1. Moreover, an air flow amount of the vehicle motor 1 is Q2, and a static pressure is P2. In comparison to the vehicle motor 9, the vehicle motor 1 has an air flow amount that is low and a static pressure that is high. As mentioned above, each of the vehicle motor 1 illustrated in FIG. 8 and the vehicle motor 9 illustrated in FIG. 10 has three types of ventilating paths. The three types of ventilating paths are provided in parallel with each other. The air flow amounts of each of the ventilating paths are determined from the fan characteristics and the pressure loss characteristics of the fans 17 and 92. The static pressure occurring in each ventilating path is the same, and for the vehicle motor 1 or 9, the total of the air flow amounts of each of the ventilating paths is the overall air flow amount.

In the aforementioned manner, the air flow amount is low and the static pressure is high for the vehicle motor 1 in comparison to the vehicle motor 9. Moreover, the total surface area of the cross section of the rotor ventilating paths 43 perpendicular to the Y axis is smaller than the total surface area of the cross section of the rotor ventilating paths 91 perpendicular to the Y axis. The downwind side flow path of the vehicle motor 1 is more complex than in the case of the vehicle motor 9, and the ventilation cross-sectional area in the vicinity of the end portion of the stator coil 20 of the vehicle motor 1 is smaller than in the case of the vehicle motor 9. The pressure losses occurring in the rotor ventilating path 43 and the stator ventilating path 42 including the downwind side flow path of the vehicle motor 1 thus is greater than the pressure loss occurring in the rotor ventilating path 91 and the stator ventilating path 42 including the downwind side flow path of the vehicle motor 9. The air flow amount and the air flow velocity occurring in the inter-iron core gap 41 of the vehicle motor 1 are thus larger than in the case of the vehicle motor 9. This results in improvement of the heat transfer coefficient occurring in the inter-iron core gap 41. The rotor ventilating path 43 is not formed in the vehicle motor 1 illustrated in FIG. 1, and thus the heat transfer coefficient occurring in the inter-iron core gap 41 further increases.

In the aforementioned manner, the downwind side flow path of the vehicle motor 1 is more complex than the downwind side flow path of the vehicle motor 9, and the ventilation cross-sectional area in the vicinity of the end portion of the stator coil 20 of the vehicle motor 1 is smaller than in the case of the vehicle motor 9. The pressure loss occurring in the downwind side flow path of the stator ventilating path 42 of the vehicle motor 1 is thus larger than the pressure loss occurring in the downwind side flow path of the stator ventilating path 42 of the vehicle motor 9. Moreover, in the case in which the overall air flow amount is the same for both the vehicle motor 1 and the vehicle motor 9, the air flow amount occurring in the stator ventilating path 42 of the vehicle motor 1 is smaller than the air flow amount occurring in the stator ventilating path 42 of the vehicle motor 9. However, for the vehicle motor 1 in the aforementioned manner, at the position at which the air passing through the stator ventilating path 42 contacts the stator coil 20, the local air flow velocity increases, and the surface area of the stator coil 20 contacting the flow of air increases, and thus the heat transfer coefficient occurring at the end portion of the stator coil 20 increases. Due to the increase in the heat transfer coefficient occurring at the inter-iron core gap 41 and the end portion of the stator coil 20, the cooling performance of the vehicle motor 1 improves.

In the aforementioned manner, according to the vehicle motor 1 according to Embodiment 1 of the present disclosure, due to providing of the first air guiding member 51 and the second air guiding member 52, cooling performance can be improved within the self-ventilating type vehicle motor 1.

Embodiment 2

Figure 13:
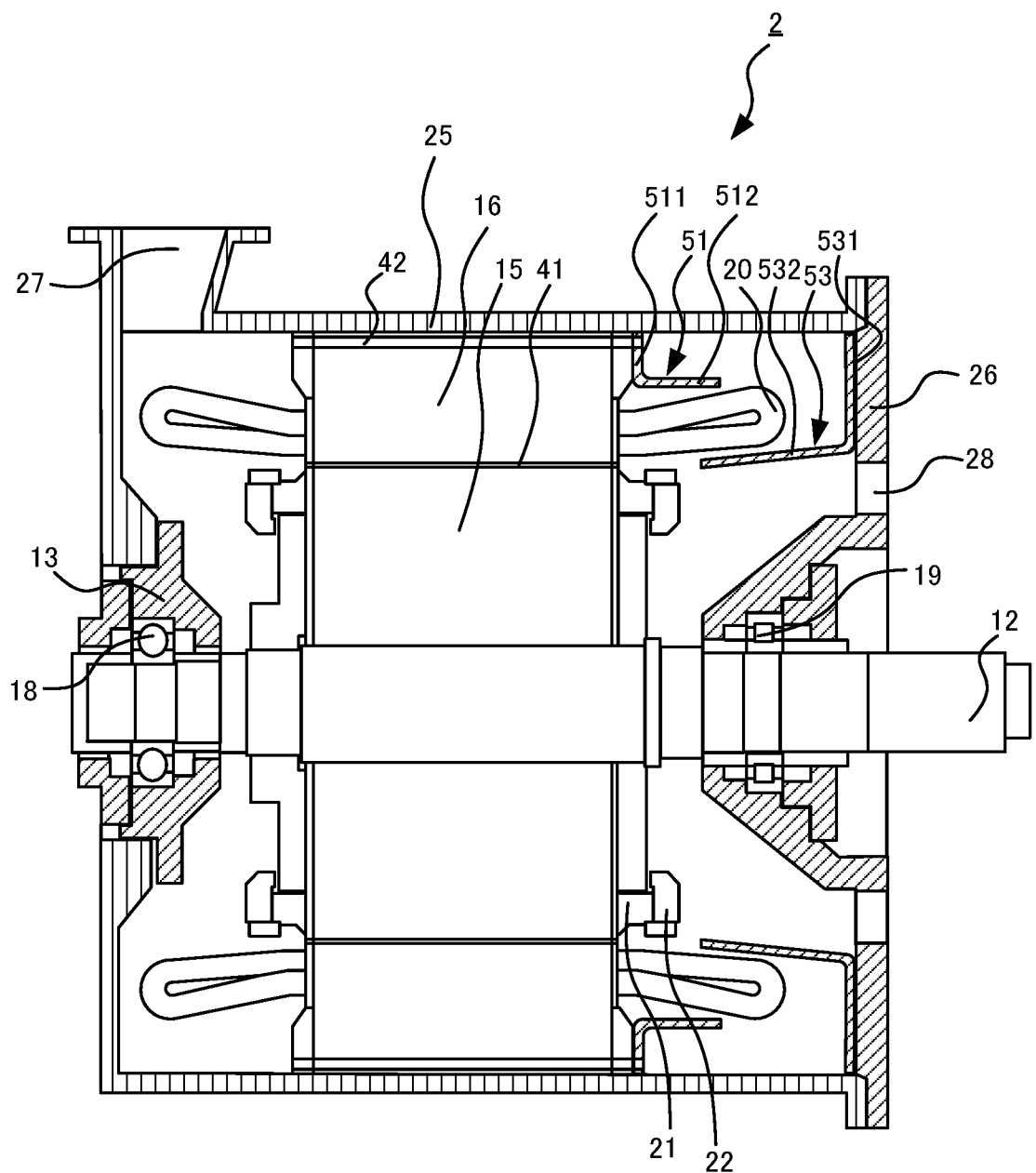
FIG. 13 is a cross-sectional view of a vehicle motor according to Embodiment 2 of the present disclosure.

FIG. 13 is a cross-sectional view of a vehicle motor according to Embodiment 2 of the present disclosure. This drawing is viewed in a manner similar to that of FIG. 1. A vehicle motor 2 according to Embodiment 2 is equipped with a frame 25 in place of the frame 11 provided for the vehicle motor 1. Moreover, the vehicle motor 2 is equipped with a second bracket 26 in place of the second bracket 14 provided for the vehicle motor 1. The vehicle motor 2 is a forced air-cooled type motor and is not equipped with the fan 17. At the first bracket 13 side end portion of the frame 25, a suction port 27 is formed into which flows air exterior to the frame 25. In FIG. 13, the suction port 27 is formed in a vertical direction top side surface of the frame 25. Air sent via a duct from a non-illustrated air blower provided at the exterior flows into the interior of the vehicle motor 2 from the suction port 27. In the vehicle motor 2, an exhaust port 28 is formed in the second bracket 26. The exhaust port 28 is formed over the entire circumference at predetermined intervals at the periphery of the rotor shaft 12. In the vehicle motor 2, the downwind side air guiding member has the first air guiding member 51 and a third air guiding member 53.

Configuration of the first air guiding member 51 is the same as the configuration of the first air guiding member 51 provided for the vehicle motor 1 according to Embodiment 1. The first air guiding member 51 contacts the stator core 16 and forms a flow path between the inner peripheral surface of the frame 25 and the first air guiding member 51. Air passing through the stator ventilating path 42 is guided by the first air guiding member 51 through the space between the cylindrical part of the first air guiding member 51 and the inner peripheral surface of the frame 25, and to the end portion of the stator coil 20.

Figure 14:
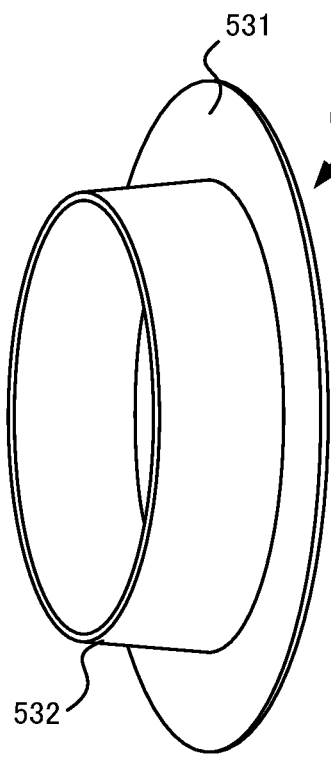
FIG. 14 is a perspective view of a third air guiding member according to Embodiment 2.
Figure 15:
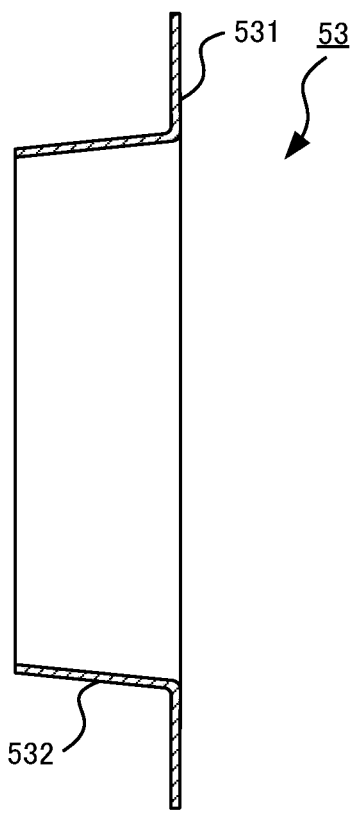
FIG. 15 is a cross-sectional view of the third air guiding member according to Embodiment 2.

FIG. 14 is a perspective view of the third air guiding member according to Embodiment 2. FIG. 15 is a cross-sectional view of the third air guiding member according to Embodiment 2. The shape of the cross section of the third air guiding member 53 perpendicular to the Y axis is annular. As illustrated in FIG. 13, an end portion of the third air guiding member 53 in one Y axis direction contacts the second bracket 26. A fastening member 531 illustrated in FIGS. 14 and 15 that is this end portion is fastened to the second bracket 26. A portion of the fastening member 531 abuts against an outer peripheral side of the exhaust port 28. As illustrated in FIG. 13, a portion of a cylindrical part 532 of the third air guiding member 53 has a cylindrical shape extending in the Y axis direction and opposes a portion of the cylindrical part 512 of the first air guiding member 51 extending in the Y axis direction with the stator coil 20 being sandwiched therebetween. The cylindrical part 532 guides air contacting the end portion of the stator coil 20 toward the stator core 16 from the end portion of the stator coil 20. Moreover, the cylindrical part 532 guides to the exhaust port 28 the air guided toward the stator core 16. In the aforementioned example, cross sections of the cylindrical part 532 perpendicular to the Y axis become larger toward the exhaust port 28 in the Y axis direction. By changing size of the cross section of the cylindrical part 532 perpendicular to the Y axis in accordance with the slope of the inner peripheral surface of the stator coil 20, the third air guiding member 53 and the stator coil 20 can be brought close to each other. Further, size of the cross section of the cylindrical part 532 perpendicular to the Y axis may be fixed.

Figure 16:
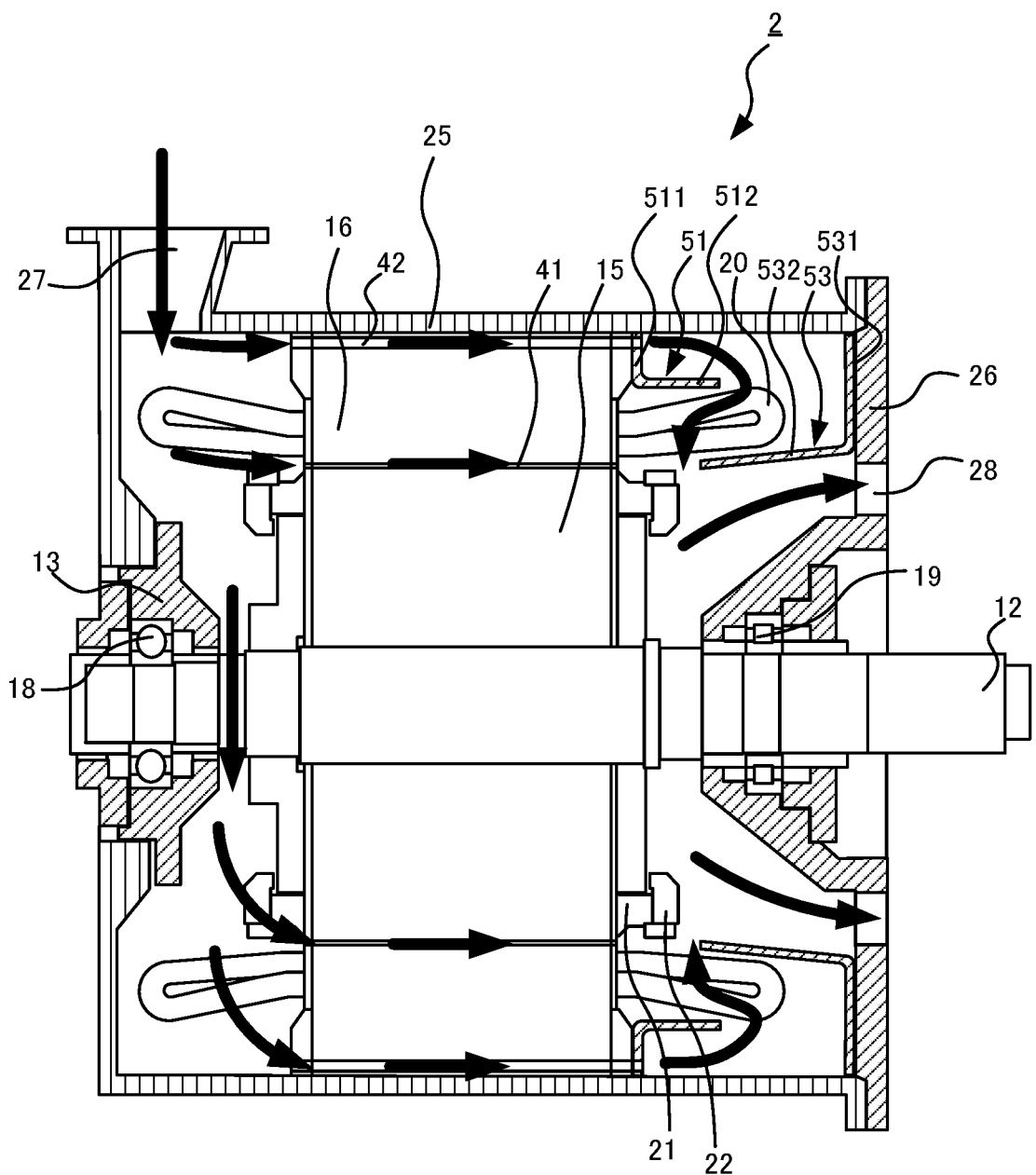
FIG. 16 is a drawing illustrating flow of air occurring in the vehicle motor according to Embodiment 2.
Figure 16:
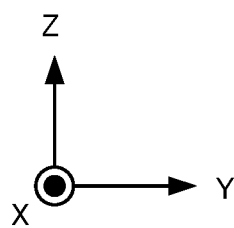

FIG. 16 is a drawing illustrating flow of air occurring in the vehicle motor according to Embodiment 2. This drawing is viewed in a manner similar to that of FIG. 7. Air exterior to the vehicle motor 2 passes through the suction port 27 and flows into the interior of the vehicle motor 2. A portion of the air flowing into the interior of the vehicle motor 2 arrives at the stator ventilating path 42. The air passing through the stator ventilating path 42 then passes through the flow path between the outer peripheral surface of the cylindrical part 512 of the first air guiding member 51 and the inner peripheral surface of the frame 25, and contacts the end portion of the stator coil 20. Due to providing of the third air guiding member 53, the air contacted with the end portion of the stator coil 20 flows toward the stator core 16 along the stator coil 20, then arrives at the exhaust port 28, and is discharged from the exhaust port 28. Providing of the third air guiding member 53 suppresses direct arrival at the exhaust port 28 of the air passed through the stator ventilating path 42.

Due to setting of the gap between the third air guiding member 53 and the stator coil 20 to a value less than or equal the threshold, the third air guiding member 53 and the stator coil 20 are adjacent to each other. The threshold is determined in accordance with cooling performance desired for the vehicle motor 2. Due to the outer peripheral surface of the third air guiding member 53 and the stator coil 20 being near to each other, the air contacted with the end portion of the stator coil 20 arrives at the exhaust port 28 after flowing toward the stator core 16 along the stator coil 20. Moreover, another portion of the air flowing into the vehicle motor 2 passes through the inter-iron core gap 41 and arrives at the exhaust port 28.

Due to providing of the first air guiding member 51 and the third air guiding member 53 and causing the third air guiding member 53 and the stator coil 20 to be near each other, the air passed through the stator ventilating path 42 flows through the flow path between the cylindrical part 512 of the first air guiding member 51 at the outer peripheral side of the stator coil 20 and the cylindrical part 532 of the third air guiding member 53 at the inner periphery side. The distance of the flow path through which air flows while contacting the stator coil 20 is thus longer than in the case of the vehicle motor 9. In accordance with the vehicle motor 2 according to Embodiment 2, air flows between the first air guiding member 51 and the third air guiding member 53, and thus air flow velocity increases locally at locations of contact with the stator coil 20. Moreover, the distance of the flow path through which air flows while contacting the stator coil 20 lengthens, and thus the surface area of the stator coil 20 contacting the flow of air increases. The heat transfer coefficient occurring at the stator coil 20 thus increases.

In FIGS. 13 and 16, the vehicle motor 2 has two types of ventilating paths, that is to say, the inter-iron core gap 41 and the stator ventilating path 42. In the vehicle motor 2, in a manner similar to that of the vehicle motor 1 illustrated in FIG. 8, the rotor ventilating path 43 may be formed in the rotor core 15 and extend in the axial direction of the rotor shaft 12. In this case, the vehicle motor 2 has three types of ventilating paths, that is to say, the inter-iron core gap 41, the stator ventilating path 42, and the rotor ventilating path 43. In the case in which the rotor ventilating path 43 is provided, total surface area of a cross section of the rotor ventilating paths 43 perpendicular to the Y axis direction is set within a determined range. This range can be determined in accordance with cooling performance desired for the vehicle motor 2.

The vehicle motor 2 is equipped with the first air guiding member 51 and the third air guiding member 53, and the gap between the third air guiding member 53 and the stator coil 20 is narrower than the gap between the side plate 924 and the stator coil 20 occurring in the vehicle motor 9. The downwind side flow path of the vehicle motor 2 is thus more complex than that the downwind side flow path of the vehicle motor 9, and the ventilation cross-sectional area in the vicinity of the end portion of the stator coil 20 of the vehicle motor 2 is smaller than in the case of the vehicle motor 9. Therefore, the pressure loss occurring in the rotor ventilating path 43 and the stator ventilating path 42 including the downwind side flow path of the vehicle motor 2 is larger than the pressure loss occurring in the rotor ventilating path 91 and the stator ventilating path 42 including the downwind side flow path of the vehicle motor 9. The air flow amount and the air flow velocity occurring in the inter-iron core gap 41 of the vehicle motor 2 are thus larger than in the case of the vehicle motor 9. This has the effect of increasing the heat transfer coefficient occurring in the inter-iron core gap 41. Due to the rotor ventilating path 43 not being formed in the vehicle motor 2 illustrated in FIG. 13, the heat transfer coefficient occurring in the inter-iron core gap 41 increases.

In the aforementioned manner, the downwind side flow path of the vehicle motor 2 is more complex than the downwind side flow path of the vehicle motor 9, and the ventilation cross-sectional area in the vicinity of the end portion of the stator coil 20 of the vehicle motor 2 is smaller than in the case of the vehicle motor 9. The pressure loss occurring in the downwind side flow path of the stator ventilating path 42 of the vehicle motor 2 thus is larger than the pressure loss occurring in the downwind side flow path of the stator ventilating path 42 of the vehicle motor 9. Moreover, in the case in which the overall air flow amounts of the vehicle motor 2 and the vehicle motor 9 are the same, the air flow amount occurring in the stator ventilating path 42 of the vehicle motor 2 is smaller than the air flow amount occurring in the stator ventilating path 42 of the vehicle motor 9. However, in the aforementioned manner, at locations of contact with the stator coil 20 of the vehicle motor 2, the air flow velocity locally increases, and the surface area of the stator coil 20 contacting the flow of air increases, and thus the heat transfer coefficient occurring at the end portion of the stator coil 20 increases. Due to increase in the heat transfer coefficients occurring at the inter-iron core gap 41 and the end portion of the stator coil 20, cooling performance of the vehicle motor 2 improves.

As described above, in accordance with the vehicle motor 2 according to Embodiment 2 of the present disclosure, due to providing of the first air guiding member 51 and the third air guiding member 53, cooling performance of the interior of the forced air-cooled type vehicle motor 2 can be improved.

Embodiment 3

Figure 17:
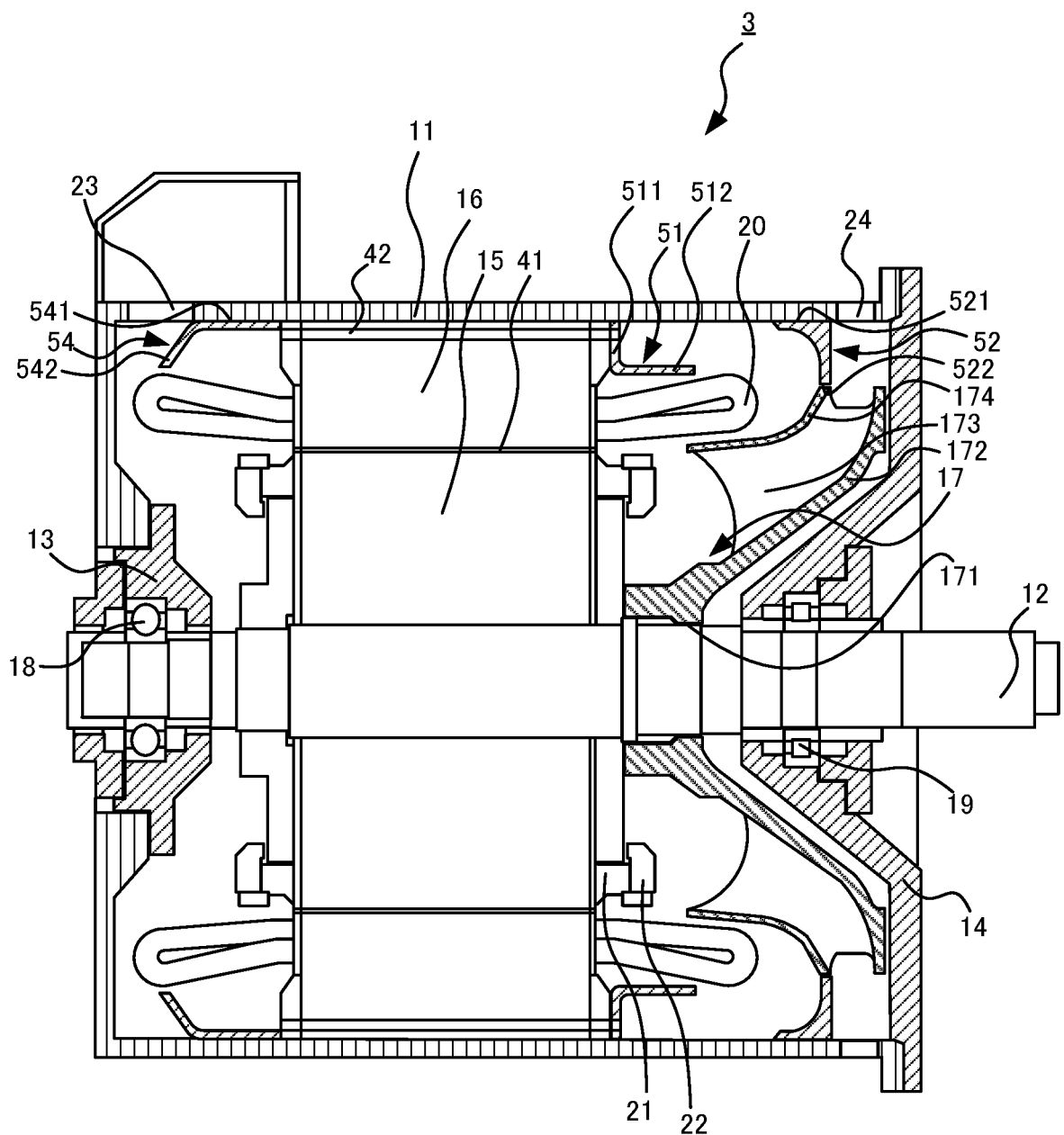
FIG. 17 is a cross-sectional view of a vehicle motor according to Embodiment 3 of the present disclosure.

FIG. 17 is a cross-sectional view of a vehicle motor according to Embodiment 3 of the present disclosure. This drawing is viewed in a manner similar to that of FIG. 1. In addition to the configuration of the vehicle motor 1 according to Embodiment 1, the vehicle motor 3 according to Embodiment 3 is further equipped with an upwind side air guiding member that suppresses at least a portion of air flowing in from the suction port 23 from arriving directly at the stator ventilating path 42 and that guides at least a portion of the air flowing in from the suction port 23 to the stator ventilating path 42 after contacting the end portion of the stator coil 20. In Embodiment 3, the upwind side air guiding member has a fourth air guiding member 54.

Figure 18:
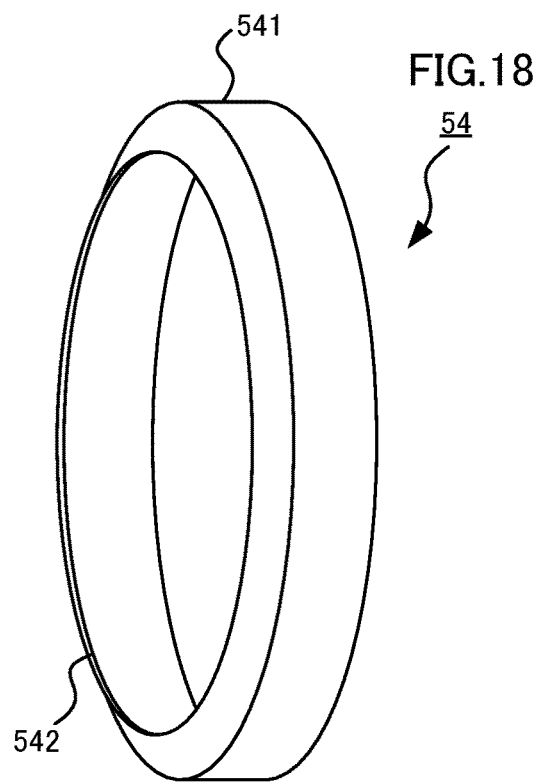
FIG. 18 is a perspective view of a fourth air guiding member according to Embodiment 3.
Figure 19:
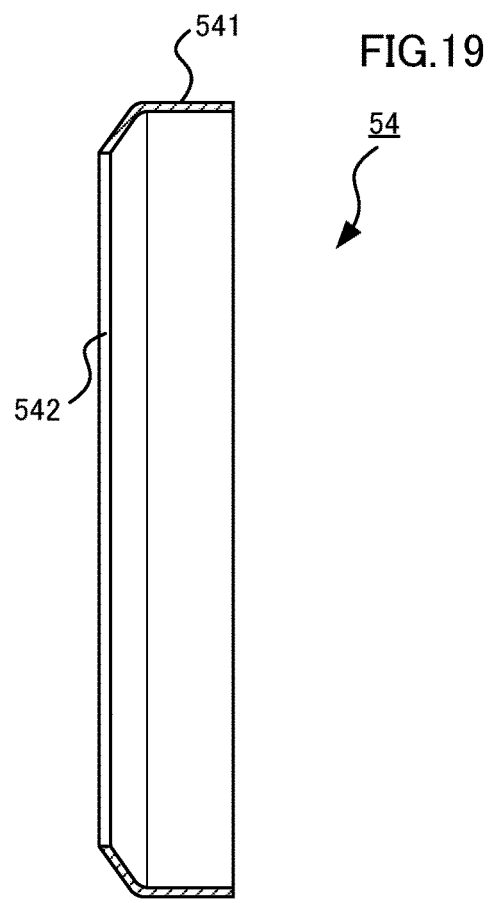
FIG. 19 is a cross-sectional view of the fourth air guiding member according to Embodiment 3.

FIG. 18 is a perspective view of the fourth air guiding member according to Embodiment 3. FIG. 19 is a cross-sectional view of the fourth air guiding member according to Embodiment 3. Shape of a cross section of the fourth air guiding member 54 perpendicular to the Y axis is annular. An outer peripheral surface of the fourth air guiding member 54 contacts the inner peripheral surface of the frame 11. The fourth air guiding member 54 is engaged by the inner peripheral surface of the frame 11 via a fitting member 541. As illustrated in FIG. 17, the fourth air guiding member 54 extends from the inner peripheral surface of the frame 11 toward the end portion of the stator coil 20. A portion of the outer peripheral surface of the fourth air guiding member 54 abuts against the stator core 16 side of the suction port 23. A stator coil opposing member 542 that is an end portion of the fourth air guiding member 54 opposes the outer peripheral surface of the end portion of the stator coil 20. The fourth air guiding member 54 guides to the end portion of the stator coil 20 the air flowing in from the suction port 23 to then pass between the fourth air guiding member 54 and the surface of the frame 11 perpendicular to the Y axis direction. The air contacted with the end portion of the stator coil 20 arrives at the stator ventilating path 42. Providing of the fourth air guiding member 54 suppresses the direct arrival at the stator ventilating path 42 of the air flowing in from the suction port 23.

Figure 20:
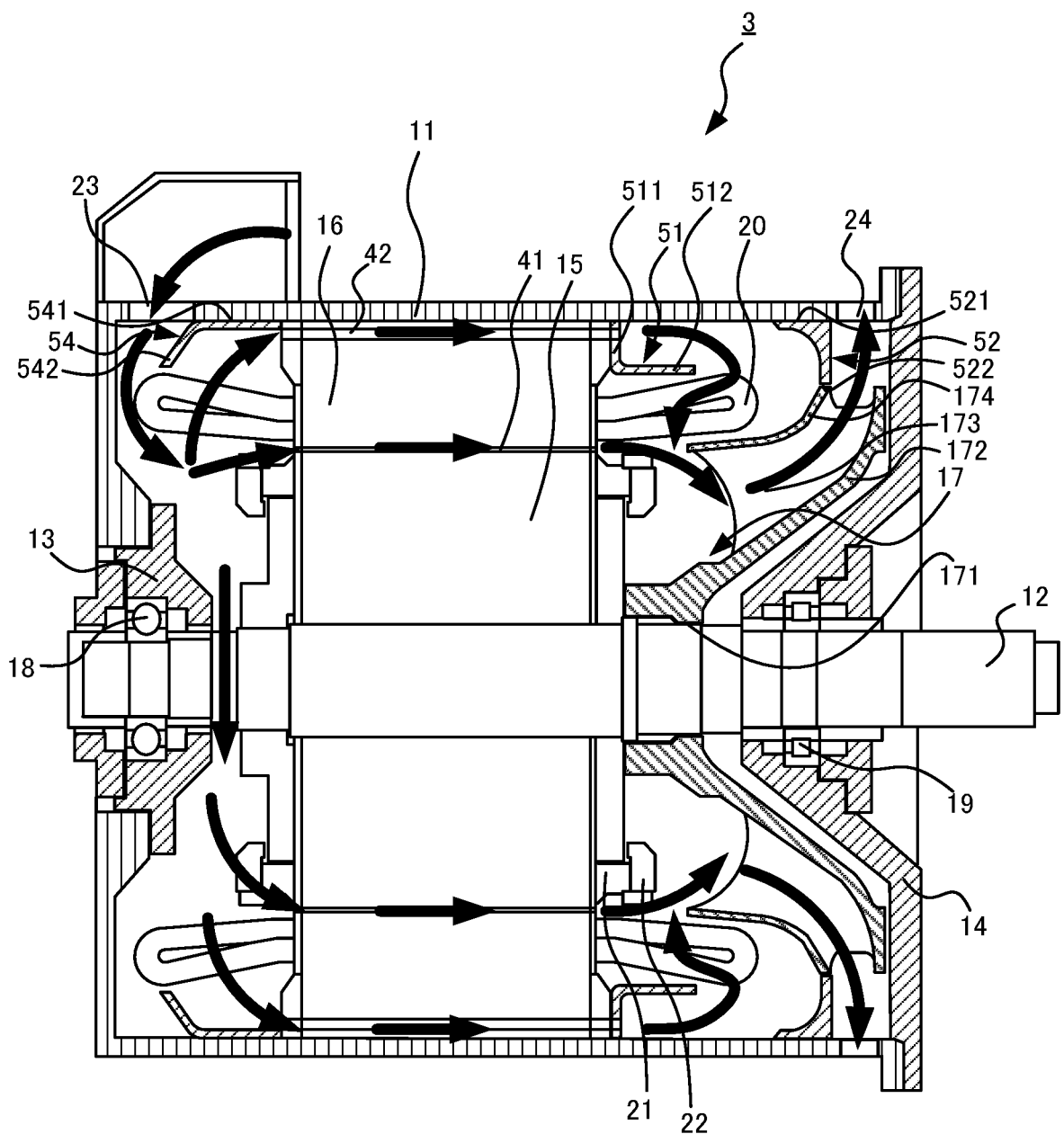
FIG. 20 is a drawing illustrating flow of air occurring in the vehicle motor according to Embodiment 3.

FIG. 20 is a drawing illustrating flow of air occurring in the vehicle motor according to Embodiment 3. This drawing is viewed in a manner similar to that of FIG. 7. The air exterior to the vehicle motor 3 flows into the interior of the vehicle motor 3 through the suction port 23. The air flowing into the vehicle motor 3 then passes through a gap between the fourth air guiding member 54 and a surface of the frame 11 perpendicular to the Y axis direction. A portion of the air passed through the gap between the fourth air guiding member 54 and the surface of the frame 11 perpendicular to the Y axis direction then contacts the end portion of the stator coil 20 and arrives at the stator ventilating path 42. The air passed through the stator ventilating path 42, in a manner similar to that of Embodiment 1, passes through the flow path between the inner peripheral surface of the frame 11 and the cylindrical part 512 of the first air guiding member 51, and contacts the end portion of the stator coil 20. By the second air guiding member 52 and the side plate 174 of the fan 17, the air contacted with the end portion of the stator coil 20 flows toward the stator core 16 along the stator coil 20, and arrives at the entrance part of the fan 17.

By setting the gap between the fourth air guiding member 54 and the stator coil 20 to a value less than or equal to a threshold, the fourth air guiding member 54 and the stator coil 20 are near to each other. The threshold can be determined in accordance with cooling performance desired for the vehicle motor 3. Due to the fourth air guiding member 54 and the stator coil 20 being near to each other, the air passing into the interior of the vehicle motor 3, after contacting the stator coil 20, arrives at the stator ventilating path 42. Moreover, another portion of the air flowing into the interior of the vehicle motor 3 passes through the inter-iron core gap 41 and arrives at the fan 17. The air discharged from the fan 17 passes through the flow path between the second air guiding member 52 and the second bracket 14, and is discharged from the exhaust port 24.

Due to providing of the fourth air guiding member 54 and arrangement of the fourth air guiding member 54 and the stator coil 20 near each other, the air flowing in from the suction port 23, prior to arriving at the stator ventilating path 42, flows in the peripheral direction gap between the stator coils 20. Therefore, at the position of contact with the stator coil 20, the air flow velocity locally increases. This increases the heat transfer coefficient occurring at the stator coil 20.

In FIGS. 17 and 20, the vehicle motor 3 has two types of ventilating paths, that is to say, has the inter-iron core gap 41 and the stator ventilating path 42. In the vehicle motor 3, in a manner similar to that of the vehicle motor 1 illustrated in FIG. 8, may have formed in the rotor core 15 the rotor ventilating path 43 extending in the axial direction of the rotor shaft 12. In this case, the vehicle motor 3 has three types of ventilating paths, that is to say, the inter-iron core gap 41, the stator ventilating path 42, and the rotor ventilating path 43. In the case in which the rotor ventilating path 43 is provided, the total surface area of the cross section of the rotor ventilating paths 43 perpendicular to the Y axis direction is set within a determined range. This range can be determined in accordance with cooling performance desired for the vehicle motor 3.

Due to equipping of the vehicle motor 3 with the fourth air guiding member 54, the upwind side flow path, which is the flow path occurring in the vehicle motor 3 from the suction port 23 to the stator ventilating path 42, is more complex than the upwind side flow path of the vehicle motor 9. Moreover, in a manner similar to that of Embodiment 1, the downwind side flow path of the vehicle motor 3 is more complex than the downwind side flow path of the vehicle motor 9. The vehicle motor 3 has the upwind side flow path and the downwind side flow path that are more complex, and the ventilation cross-sectional area in the vicinity of both end portions of the stator coil 20 of the vehicle motor 3 is smaller than in the case of the vehicle motor 9. Therefore, the pressure loss occurring in the rotor ventilating path 43 and both the upwind side flow path and the downwind side flow path of the stator ventilating path 42 of the vehicle motor 3 is greater than the pressure loss occurring in the rotor ventilating path 91 and both the upwind side flow path and the downwind side flow path of the stator ventilating path 42 of the vehicle motor 9. Therefore, the air flow amount and the air flow velocity occurring in the inter-iron core gap 41 of the vehicle motor 3 are larger than in the case of the vehicle motor 9. As a result, the heat transfer coefficient occurring in the inter-iron core gap 41 increases. In the vehicle motor 3 illustrated in FIG. 17, the rotor ventilating path 43 is not formed, and thus the heat transfer coefficient occurring in the inter-iron core gap 41 further increases.

In the aforementioned manner, the upwind side flow path and the downwind side flow path of the vehicle motor 3 are more complex than the upwind side flow path and the downwind side flow path of the vehicle motor 9, and the ventilation cross-sectional area in the vicinity of both end portions of the stator coil 20 of the vehicle motor 3 is smaller than in the case of the vehicle motor 9. Therefore, the pressure loss occurring in the stator ventilating path 42 due to including the upwind side flow path and the downwind side flow path of the vehicle motor 3 is larger than the pressure loss occurring in the stator ventilating path 42 due to including the upwind side flow path and the downwind side flow path of the vehicle motor 9. Moreover, also in the case in which the overall air flow amounts of the vehicle motor 3 and the vehicle motor 9 are the same, the air flow amount occurring in the stator ventilating path 42 of the vehicle motor 3 is smaller than the air flow amount occurring in the stator ventilating path 42 of the vehicle motor 9. However, in the aforementioned manner, for the vehicle motor 3, the air flow velocity increases locally at locations of contact with the stator coil 20, and the surface area of the stator coil 20 contacting the flow of the air increases, and thus heat transfer coefficient occurring in the end portion of the stator coil 20 increases. Due to increase in the heat transfer coefficient occurring in the inter-iron core gap 41 and in the end portion of the stator coil 20, cooling performance of the vehicle motor 3 increases.

In the aforementioned example, although the shape of the cross section of the fourth air guiding member 54 perpendicular to the Y axis is annular, the shape of the cross section of the fourth air guiding member 54 perpendicular to the Y axis may be partial annular. In the case in which the shape of the cross section of the fourth air guiding member 54 perpendicular to the Y axis is partial annular, a plane passing through the centroid of the partial annular shape and the axis of the rotor shaft 12 passes through the suction port 23. This plane preferably passes through the centroid of the opening of the suction port 23.

In the aforementioned manner, due to providing of the fourth air guiding member 54 in accordance with the vehicle motor 3 according to Embodiment 3 of the present disclosure, cooling performance of the interior of the self-ventilating type vehicle motor 3 can be improved.

Embodiment 4

Figure 21:
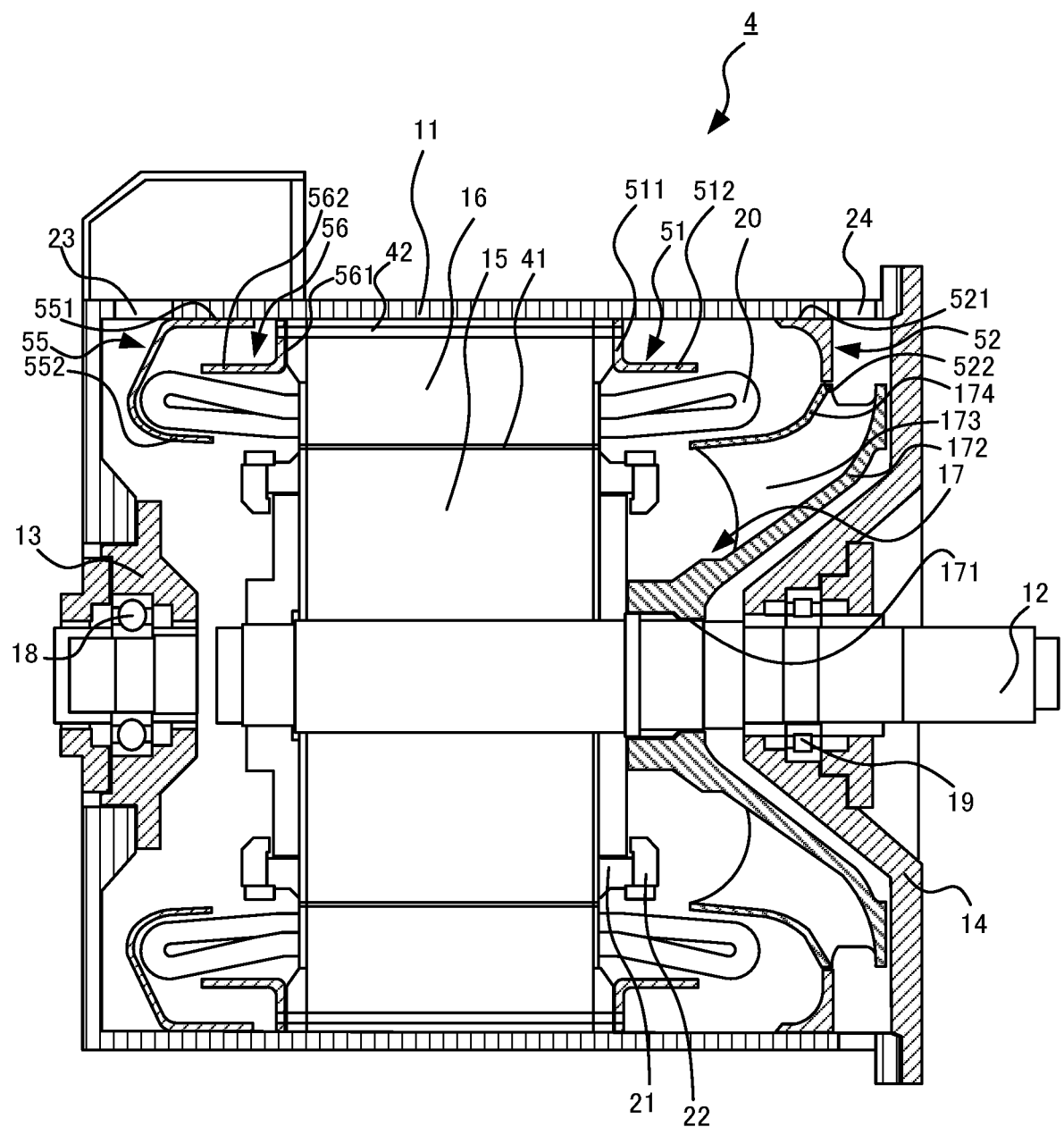
FIG. 21 is a cross-sectional view of a vehicle motor according to Embodiment 4 of the present disclosure.
Figure 21:
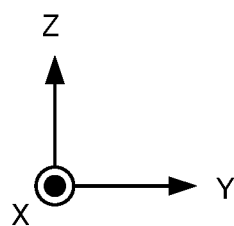

FIG. 21 is a cross-sectional view of a vehicle motor according to Embodiment 4 of the present disclosure. This drawing is viewed in a manner similar to that of FIG. 1. A vehicle motor 4 according to Embodiment 4, in addition to the configuration of the vehicle motor 1 according to Embodiment 1, is further equipped with an upwind side air guiding member that causes at least a portion of air flowing in from the suction port 23 to be guided to contact the end portion of the stator coil 20 and toward the stator ventilating path 42. In Embodiment 4, the upwind side air guiding member has a fifth air guiding member 55 and a sixth air guiding member 56.

Figure 22:
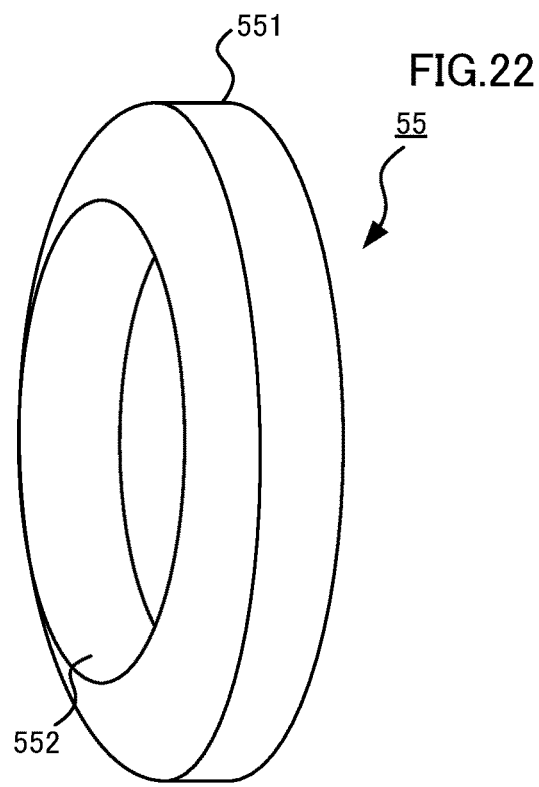
FIG. 22 is a perspective view of a fifth air guiding member according to Embodiment 4.
Figure 23:
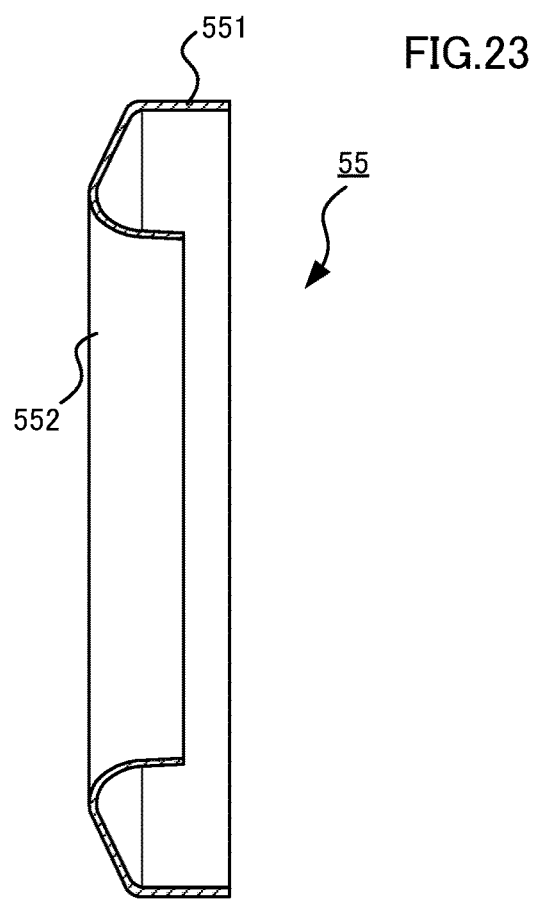
FIG. 23 is a cross-sectional view of a fifth air guiding member according to Embodiment 4.

FIG. 22 is a perspective view of the fifth air guiding member according to Embodiment 4. FIG. 23 is a cross-sectional view of the fifth air guiding member according to Embodiment 4. Shape of the cross section of the fifth air guiding member 55 perpendicular to the Y axis is annular. An outer peripheral surface of the fifth air guiding member 55 contacts the inner peripheral surface of the frame 11. The fifth air guiding member 55 is engaged by a fitting member 551 with the inner peripheral surface of the frame 11. As illustrated in FIG. 21, the fifth air guiding member 55 has a cylindrical part 552 passing from the inner peripheral surface of the frame 11 through the gap between the end portion of the stator coil 20 and the first bracket 13 side frame 11 end portion, and along the end portion of the stator coil 20, extending toward the stator core 16 at the inner peripheral side of the stator coil 20. The cylindrical part 552 has a bent annular shape. A portion of the outer peripheral surface of the fifth air guiding member 55 is adjacent to the stator core 16 side of the suction port 23. At least a portion of the air flowing in from the suction port 23 is guided by the cylindrical part 552 toward the stator core 16. Moreover, the cylindrical part 552 guides the air guided toward the stator core 16 and the end portion of the stator coil 20. In the aforementioned example, the cross section of the cylindrical part 552 perpendicular to the Y axis becomes smaller toward the stator core 16 in the Y axis direction. Due to change is size of the cross section of the cylindrical part 552 perpendicular to the Y axis in accordance with tilt of the inner peripheral surface of the stator coil 20, the fifth air guiding member 55 and the stator coil 20 can be made adjacent to each other. Further, the size of the cross section of the cylindrical part 552 perpendicular to the Y axis may be fixed.

Figure 24:
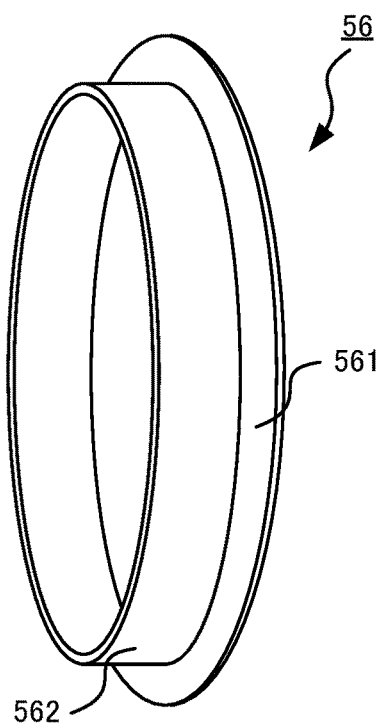
FIG. 24 is a perspective view of a sixth air guiding member according to Embodiment 4.
Figure 25:
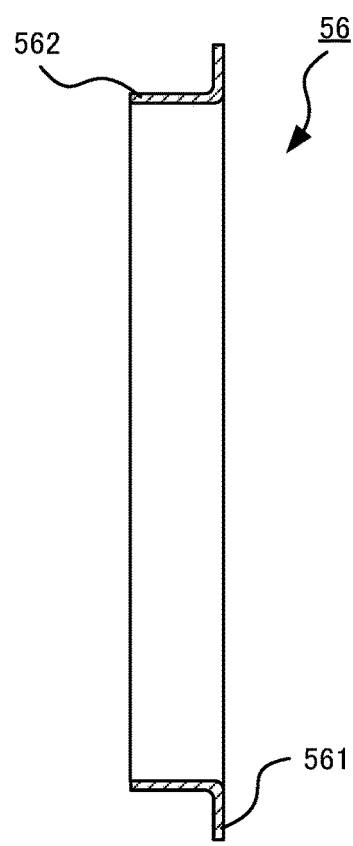
FIG. 25 is a cross-sectional view of the sixth air guiding member according to Embodiment 4.

FIG. 24 is a perspective view of a sixth air guiding member according to Embodiment 4. FIG. 25 is a cross-sectional view of the sixth air guiding member according to Embodiment 4. Shape of the cross section of the sixth air guiding member 56 perpendicular to the Y axis is annular. As illustrated in FIG. 21, an end portion in one Y axis direction of the sixth air guiding member 56 contacts the stator core 16. A fastening member 561 that is the end portion and is illustrated in FIGS. 24 and 25 is fastened to the stator core 16. A non-illustrated ventilation hole is formed in the fastening member 561 and opposes the opening of the stator ventilating path 42. As illustrated in FIG. 21, a portion of the cylindrical part 552 of the fifth air guiding member 55 opposes a portion of a cylindrical part 562 of the sixth air guiding member 56 with the stator coil 20 being sandwiched therebetween. A flow path is formed between the cylindrical part 562 that has a cylindrical shape extending in the Y axis direction of the sixth air guiding member 56 and the inner peripheral surface of the frame 11. The sixth air guiding member 56 guides the air guided toward the stator core 16 and the end portion of the stator coil 20. The sixth air guiding member 56 guides air contacted with the end portion of the stator coil 20 toward the stator ventilating path 42. The sixth air guiding member 56 may be formed by inverting the first air guiding member 51 with which the vehicle motor 1 according to Embodiment 1 is equipped relative to the XZ plane and attaching to the stator core 16.

Figure 26:
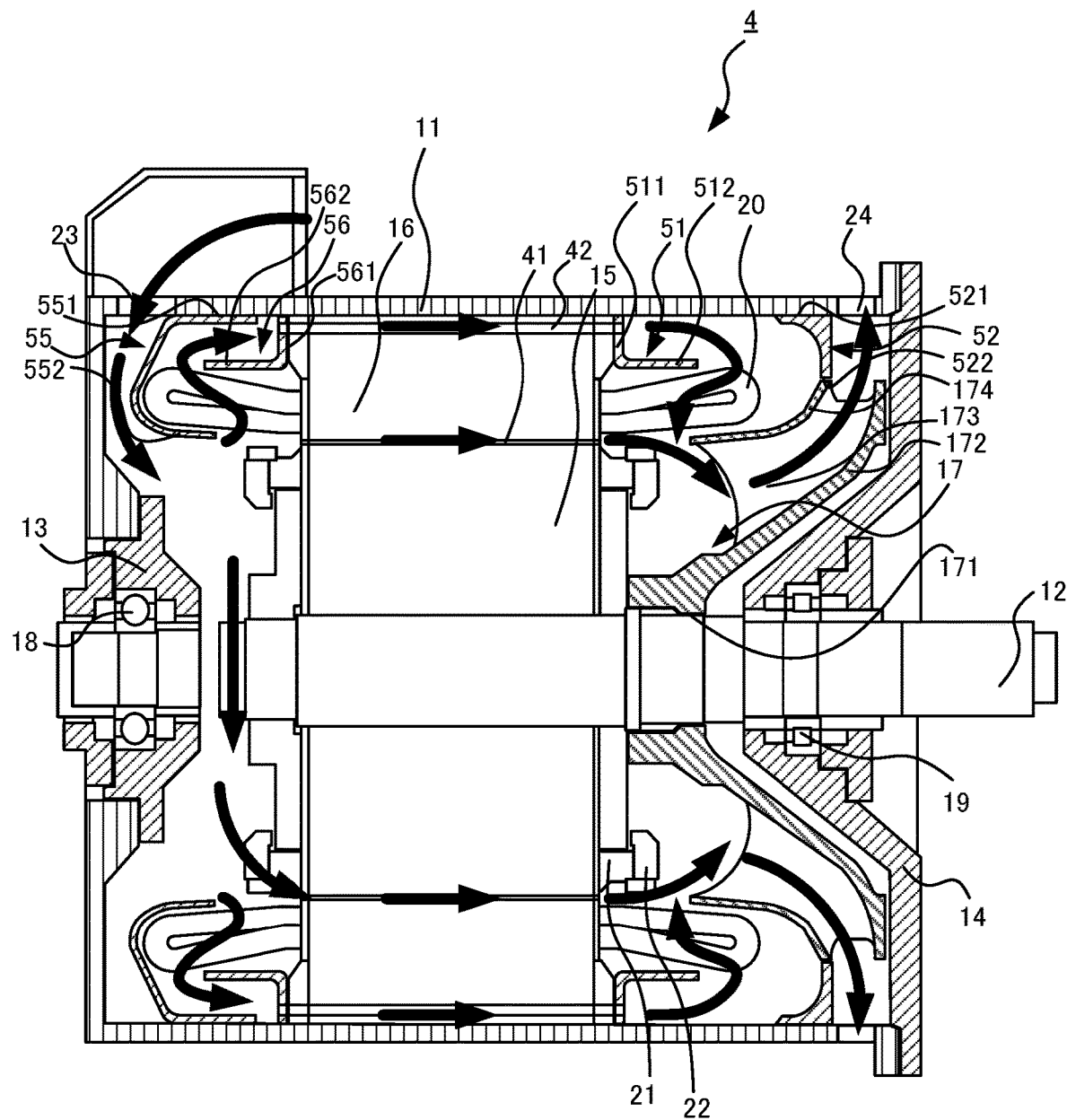
FIG. 26 is a drawing illustrating flow of air occurring in the vehicle motor according to Embodiment 4.
Figure 26:
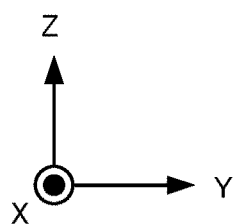

FIG. 26 is a drawing illustrating the flow of air occurring in the vehicle motor according to Embodiment 4. This drawing is viewed in a manner similar to that of FIG. 7. Air exterior to the vehicle motor 4 passes through the suction port 23 and flows into the interior of the vehicle motor 4. The air flowing into the interior of the vehicle motor 4 passes between the fifth air guiding member 55 and the surface of the frame 11 perpendicular to the Y axis direction. A portion of the air that passed between the fifth air guiding member 55 and the surface of the frame 11 perpendicular to the Y axis direction flows along the fifth air guiding member 55 toward the stator core 16, passes between outer peripheral surface of the cylindrical part 552 of the fifth air guiding member 55 and the inner peripheral surface of the sixth air guiding member 56, and thus flows from the stator core 16 side toward the end portion of the stator coil 20. The air contacted with the end portion of the stator coil 20 passes through the gap between the outer peripheral surface of the sixth air guiding member 56 and the inner peripheral surface of the frame 11 to arrive at the stator ventilating path 42. The air passed through the stator ventilating path 42, in a manner similar to that of Embodiment 1, passes through the flow path between the outer peripheral face of the first air guiding member 51 and the inner peripheral surface of the frame 11, and contacts the end portion of the stator coil 20. The air contacted with the end portion of the stator coil 20 by the second air guiding member 52 and the side plate 174 of the fan 17 flows along the stator coil 20 toward the stator core 16 and arrives at the entrance part of the fan 17. Moreover, another portion of the air flowing into the interior of the vehicle motor 4 passes through the inter-iron core gap 41 and arrives at the entrance part of the fan 17. The air discharged from the fan 17 passes through the flow path between the second air guiding member 52 and the second bracket 14 and is discharged from the exhaust port 24.

Due to providing of the fifth air guiding member 55 and the sixth air guiding member 56, the air flowing in from the suction port 23, prior to arriving at the stator ventilating path 42, passes from the stator core 16 side toward the end portion of the stator coil 20, and passes through the flow path between the cylindrical part 562 of the sixth air guiding member 56 at the outer peripheral side of the stator coil 20 and the cylindrical part 552 of the fifth air guiding member 55 at the inner peripheral side. Therefore, the distance of the flow path through which air flows while contacting the stator coil 20 is longer than in the case of the vehicle motor 9. In the vehicle motor 4 according to Embodiment 4, air flows in the upwind side between the fifth air guiding member 55 and the sixth air guiding member 56 in the same manner as the downwind side, and thus the air flow velocity locally increases at locations of contact with the stator coil 20. Moreover, due to lengthening of the distance of the flow path through which air flows while contacting the stator coil 20, the surface area of the stator coil 20 contacting the flow of air increases. This increases the heat transfer coefficient occurring at the stator coil 20.

In FIGS. 21 and 26, the vehicle motor 4 has two types of ventilating paths, that is to say, the inter-iron core gap 41 and the stator ventilating path 42. In the vehicle motor 4, in a manner similar to that of the vehicle motor 1 illustrated in FIG. 8, the rotor ventilating path 43 may be formed extending in the axial direction of the rotor shaft 12 in the rotor core 15. In this case, the vehicle motor 4 has three types of ventilating paths, that is to say, the inter-iron core gap 41, the stator ventilating path 42, and the rotor ventilating path 43. In the case in which the rotor ventilating path 43 is provided, total area of the cross section of the rotor ventilating paths 43 perpendicular to the Y axis direction is set within a determined range. This range can be determined in accordance with cooling performance desired for the vehicle motor 4.

Due to equipment of the vehicle motor 4 with the fifth air guiding member 55 and the sixth air guiding member 56, the upwind side flow path of the vehicle motor 4 is more complex than the upwind side flow path of the vehicle motor 9. Moreover, in a manner similar to that of Embodiment 1, the downwind side flow path of the vehicle motor 4 is more complex than the downwind side flow path of the vehicle motor 9. The vehicle motor 4 has the upwind side flow path and the downwind side flow path that are more complex, and the ventilation cross-sectional area in the vicinity of the both end portions of the stator coil 20 of the vehicle motor 4 is smaller than in the case of the vehicle motor 9. Thus the pressure loss occurring in the rotor ventilating path 43 and in the upwind side flow path and the downwind side flow path of both sides of the stator ventilating path 42 of the vehicle motor 4 is larger than the pressure loss that occurs in the rotor ventilating path 91 and the upwind side flow path and the downwind side flow path of both sides of the stator ventilating path 42 of the vehicle motor 9. Therefore, the air flow amount and the air flow velocity occurring in the inter-iron core gap 41 of the vehicle motor 4 are larger than in the case of the vehicle motor 9. This results in improvement of the heat transfer coefficient occurring in the inter-iron core gap 41. In the vehicle motor 4 illustrated in FIG. 21, the rotor ventilating path 43 is not formed, and thus the heat transfer coefficient occurring in the inter-iron core gap 41 further increases.

In the aforementioned manner, the upwind side flow path and the downwind side flow path of the vehicle motor 4 are more complex than the upwind side flow path and the downwind side flow path of the vehicle motor 9, and the ventilation cross-sectional area of the vicinity of both end portions of the stator coil 20 of the vehicle motor 4 is smaller than in the case of the vehicle motor 9. Therefore, the pressure loss occurring in the stator ventilating path 42 including the upwind side flow path and the downwind side flow path of the vehicle motor 4 is larger than the pressure loss occurring in the stator ventilating path 42 including the upwind side flow path and the downwind side flow path of the vehicle motor 9. Moreover, in the case in which the overall air flow amount is the same for the vehicle motor 4 and the vehicle motor 9, the air flow amount occurring in the stator ventilating path 42 of the vehicle motor 4 is smaller than the air flow amount occurring in the stator ventilating path 42 of the vehicle motor 9. However, in the aforementioned manner, the air flow velocity increases locally at locations of contact with the stator coil 20 in the vehicle motor 4, and the surface area of the stator coil 20 contacting the flow of air increases, and thus the heat transfer coefficient occurring at the end portion of the stator coil 20 increases. Due to increase in the heat transfer coefficient occurring at the inter-iron core gap 41 and at the end portion of the stator coil 20, cooling performance of the vehicle motor 4 increases.

Although shape of the cross section of the fifth air guiding member 55 perpendicular to the Y axis is annular in the aforementioned example, the shape of the cross section of the fifth air guiding member 55 perpendicular to the Y axis may be partial annular. In the case in which the shape of the cross section of the fifth air guiding member 55 perpendicular to the Y axis is partial annular, a plane passing through a centroid of the partial annular shape and the axis of the rotor shaft 12 passes through the suction port 23. The plane preferably passes through the centroid of the opening of the suction port 23.

In the aforementioned manner, due to providing of the fifth air guiding member 55 and the sixth air guiding member 56 in accordance with the vehicle motor 4 according to Embodiment 4 of the present disclosure, cooling performance of the interior of the self-ventilating type vehicle motor 4 can be increased.

Embodiment 5

Figure 27:
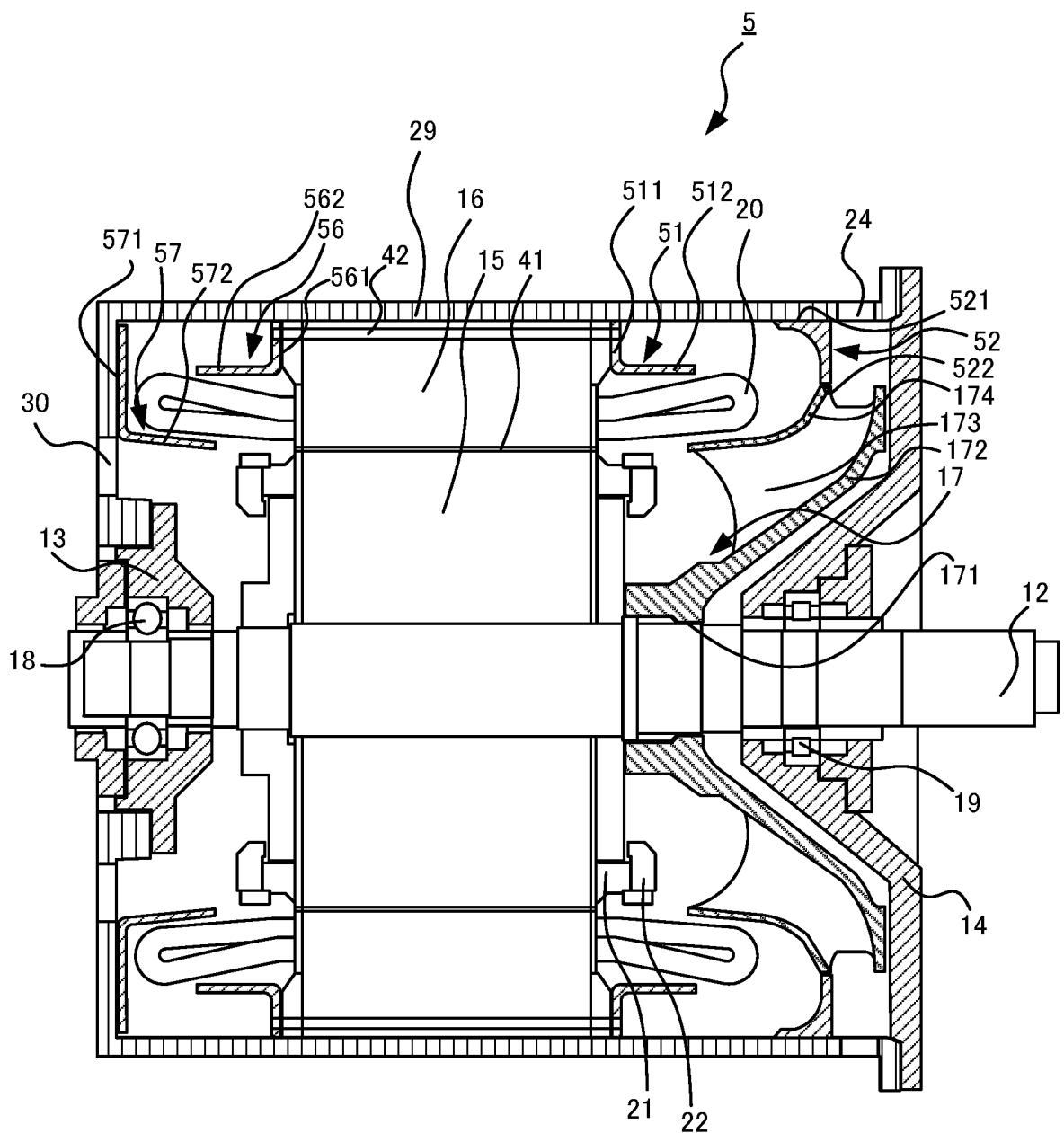
FIG. 27 is a cross-sectional view of a vehicle motor according to Embodiment 5 of the present disclosure.

FIG. 27 is a cross-sectional view of the vehicle motor according to Embodiment 5 of the present disclosure. This drawing is viewed in a manner similar to that of FIG. 1. A vehicle motor 5 according to Embodiment 5 is equipped with a frame 29 in place of the frame 11 with which the vehicle motor 1 is equipped. In the frame 29 at the first bracket 13 side perpendicular to the Y axis, suction ports 30 are formed for inflow of air exterior to the frame 29. In FIG. 27, in the surface of the frame 29 perpendicular to the Y axis, the suction port 30 is formed in the outer peripheral side of the first bracket 13. The suction ports 30 are formed around the entire circumference at predetermined intervals along the periphery of the rotor shaft 12. The vehicle motor 5 is further equipped with an upwind side air guiding member for causing at least a portion of air flowing in from the suction port 30 to contact the end portion of the stator coil 20 and to be guided to the stator ventilating path 42. In Embodiment 5, the upwind side air guiding member has the sixth air guiding member 56 and a seventh air guiding member 57.

Figure 28:
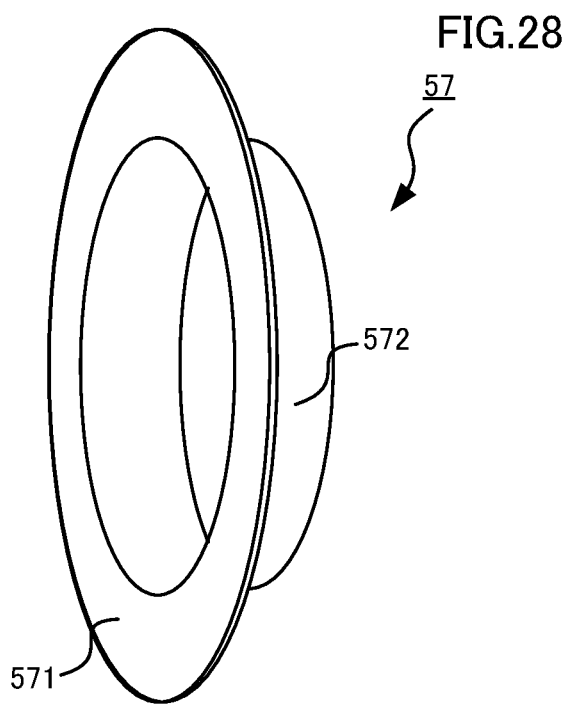
FIG. 28 is a perspective view of a seventh air guiding member according to Embodiment 5.
Figure 29:
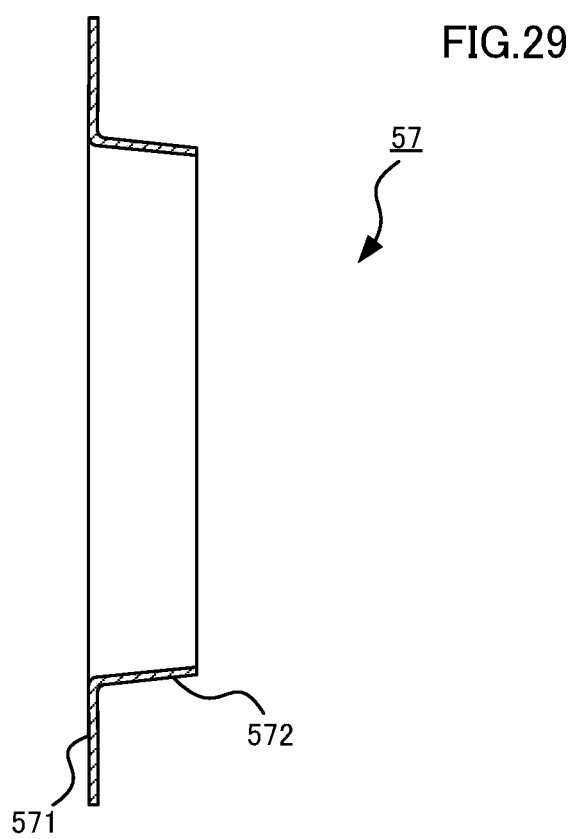
FIG. 29 is a cross-sectional view of the seventh air guiding member according to Embodiment 5.

FIG. 28 is a perspective view of the seventh air guiding member according to Embodiment 5. FIG. 29 is a cross-sectional view of the seventh air guiding member according to Embodiment 5. The shape of the cross section of the seventh air guiding member 57 perpendicular to the Y axis is annular. An end portion in one Y axis direction of the seventh air guiding member 57 contacts the first bracket 13 side of the frame 29 perpendicular to the Y axis. A fastening member 571 illustrated in FIGS. 28 and 29 is an end portion in one Y axis direction of the seventh air guiding member 57 and is fastened to the end portion of the frame 29 at the first bracket 13 side perpendicular to the Y axis. The seventh air guiding member 57 extends from this end portion of the frame 29 and along the stator coil 20 at the inner peripheral side of the stator coil 20. A portion of one end portion in the Y axis direction of the seventh air guiding member 57 is adjacent to the outer peripheral side of the suction port 30. The seventh air guiding member 57 has a cylindrical part 572 having a cylindrical shape extending in the Y axis direction. The cylindrical part 572 guides air flowing in from the suction port 30 toward the stator core 16 at the inner peripheral side of the stator coil 20. Moreover, the cylindrical part 572 guides to the end portion of the stator coil 20 the air guided toward the stator core 16. In the aforementioned example, the cross section of the cylindrical part 572 perpendicular to the Y axis becomes smaller in the Y axis direction toward the stator core 16. Due to change in the size of the cross section of the cylindrical part 572 perpendicular to the Y axis in response to the tilt of the inner peripheral surface of the stator coil 20, the seventh air guiding member 57 and the stator coil 20 can be made adjacent to each other. Further, the size of the cross section of the cylindrical part 572 perpendicular to the Y axis may be fixed.

Structure of the sixth air guiding member 56 is the same as the structure of the sixth air guiding member 56 with which the vehicle motor 4 according to Embodiment 4 is equipped. An end portion in one Y axis direction of the sixth air guiding member 56 contacts the stator core 16. The fastening member 561 that is this end portion is fastened to the stator core 16. As illustrated in FIG. 27, a portion of the cylindrical part 572 of the seventh air guiding member 57 opposes a portion of the cylindrical part 562 of the sixth air guiding member 56 with the stator coil 20 being sandwiched therebetween. A flow path is formed between the cylindrical part 562 and the inner peripheral surface of the frame 29. The sixth air guiding member 56 guides to the end portion of the stator coil 20 the air guided toward the stator core 16. The sixth air guiding member 56 guides to the stator ventilating path 42 the air contacted with the end portion of the stator coil 20.

Figure 30:
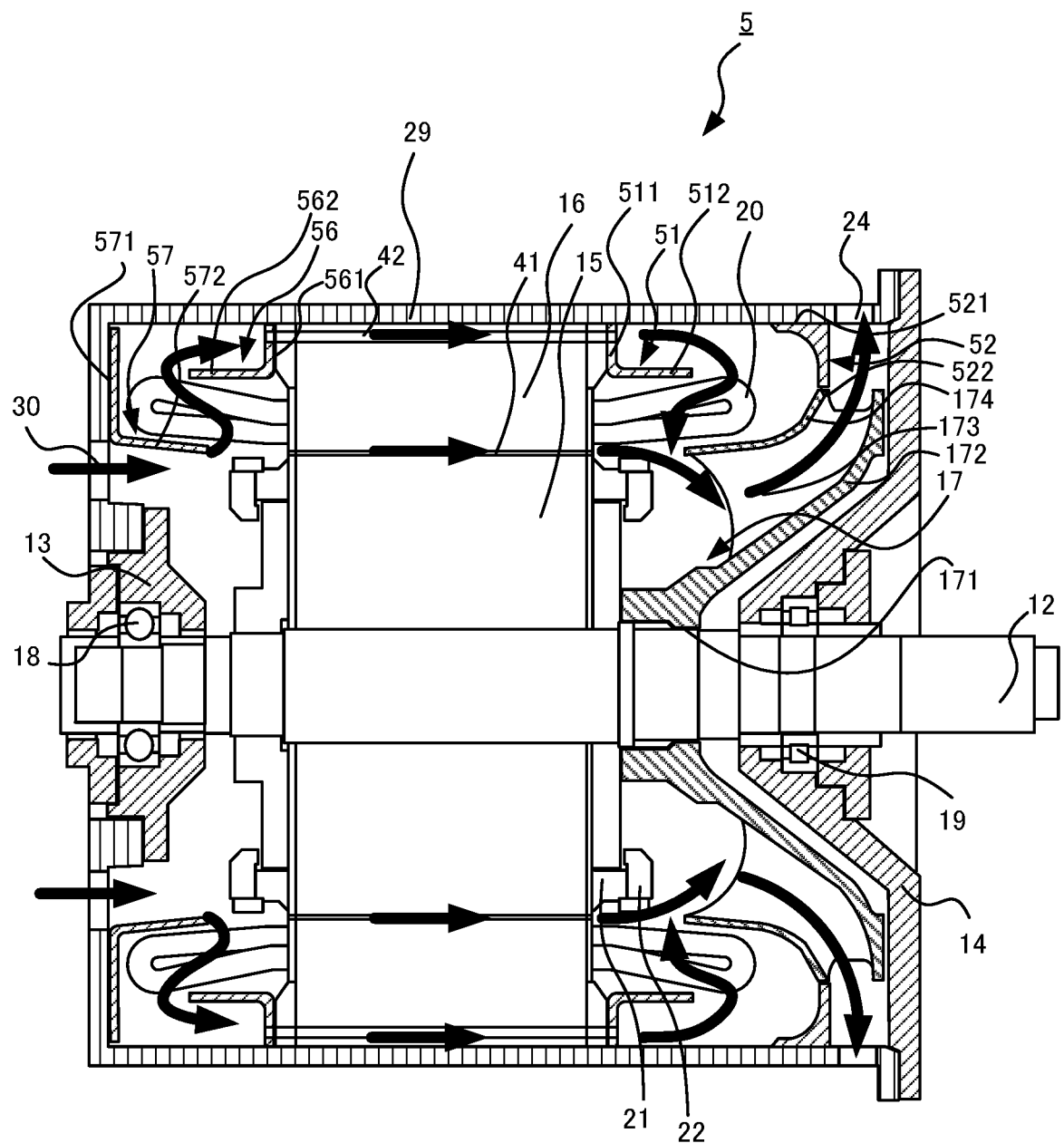
FIG. 30 is a drawing illustrating flow of air occurring in the vehicle motor according to Embodiment 5.

FIG. 30 is a drawing illustrating flow of air occurring in the vehicle motor according to Embodiment 5. This drawing is viewed in a manner similar to that of FIG. 7. Air exterior to the vehicle motor 5 flows into the interior of the vehicle motor 5 through the suction port 30. The air that flows into the interior of the vehicle motor 5, flows toward the stator core 16 along the inner peripheral surface of the cylindrical part 572 of the seventh air guiding member 57, passes between the outer peripheral surface of the cylindrical part 572 of the seventh air guiding member 57 and the inner peripheral surface of the cylindrical part 562 of the sixth air guiding member 56, and flows toward the end portion of the stator coil 20 from the stator core 16 side. The air contacting the end portion of the stator coil 20 then passes between the outer peripheral surface of the sixth air guiding member 56 and the inner peripheral surface of the frame 29, and thus arrives at the stator ventilating path 42. The air passing through the stator ventilating path 42, in a manner similar to that of Embodiment 1, passes through the flow path between the outer peripheral surface of the first air guiding member 51 and the inner peripheral surface of the frame 29, and contacts the end portion of the stator coil 20. Due to the second air guiding member 52 and the side plate 174 of the fan 17, the air contacting the end portion of the stator coil 20 flows along the stator coil 20, flows toward the stator core 16, and arrives at the entrance part of the fan 17. Moreover, another portion of the air flowing into the interior of the vehicle motor 5 passes through the inter-iron core gap 41 and arrives at the entrance part of the fan 17. The air discharged from the fan 17 passes through the flow path between the second air guiding member 52 and the second bracket 14, and is discharged from the exhaust port 24.

Due to providing of the sixth air guiding member 56 and the seventh air guiding member 57, prior to arriving at the stator ventilating path 42, the air flowing in from the suction port 30 passes from the stator core 16 side toward the end portion of the stator coil 20, and passes through the flow path between the cylindrical part 562 of the sixth air guiding member 56 at the outer periphery side of the stator coil 20 and the cylindrical part 572 of the seventh air guiding member 57 at the inner periphery side. Therefore, the distance of the flow path through which air flows while contacting the stator coil 20 is longer than in the case of the vehicle motor 9. According to the vehicle motor 5 according to Embodiment 5, in the same manner as the downwind side, air flows through the gap between the seventh air guiding member 57 and the sixth air guiding member 56, and thus the air flow velocity increases locally at locations of contact with the stator coil 20 in the upwind side. Moreover, due to lengthening of the distance of the flow path through which air flows while contacting the stator coil 20, the surface area of the stator coil 20 contacting the flow of air increases. This increases the heat transfer coefficient occurring at the stator coil 20.

In FIGS. 27 and 30, the vehicle motor 5 has two types of ventilating paths, that is to say, the inter-iron core gap 41 and the stator ventilating path 42. In the vehicle motor 5, in a manner similar to that of the vehicle motor 1 illustrated in FIG. 8, the rotor ventilating path 43 may be formed in the rotor core 15 and may extend in the axial direction of the rotor shaft 12. In this case, the vehicle motor 5 has three types of ventilating paths, that is to say, the inter-iron core gap 41, the stator ventilating path 42, and the rotor ventilating path 43. In the case in which the rotor ventilating path 43 is provided, the total surface area of the cross section of the rotor ventilating path 43 perpendicular to the Y axis direction is set within a predetermined range. The range can be determined in accordance with cooling performance desired for the vehicle motor 5.

Due to equipping of the vehicle motor 5 with the sixth air guiding member 56 and the seventh air guiding member 57, the upwind side flow path of the vehicle motor 5 is more complex than the upwind side flow path of the vehicle motor 9. Moreover, in a manner similar to that of Embodiment 1, the downwind side flow path of the vehicle motor 5 is more complex than the downwind side flow path of the vehicle motor 9. The vehicle motor 5 has the upwind side flow path and the downwind side flow path that are more complex, and the ventilation cross-sectional area in the vicinity of both end portions of the stator coil 20 of the vehicle motor 5 is smaller than in the case of the vehicle motor 9. Therefore, the pressure loss occurring in the rotor ventilating path 43 and in the upwind side flow path and the downwind side flow path of both sides of the stator ventilating path 42 of the vehicle motor 5 is larger than the pressure loss occurring in the rotor ventilating path 91 and in the upwind side flow path and the downwind side flow path of both sides of the stator ventilating path 42 of the vehicle motor 9. Therefore, the air flow amount and the air flow velocity occurring in the inter-iron core gap 41 of the vehicle motor 5 are larger than in the case of the vehicle motor 9. As a result, the heat transfer coefficient occurring at the inter-iron core gap 41 increases. In the vehicle motor 5 illustrated in FIG. 27, the rotor ventilating path 43 is not formed, and thus the heat transfer coefficient occurring in the inter-iron core gap 41 further increases.

In the aforementioned manner, the upwind side flow path and the downwind side flow path of the vehicle motor 5 are more complex than the upwind side flow path and the downwind side flow path of the vehicle motor 9, and the ventilation cross-sectional area in the vicinity of both end portions of the vehicle motor 5 stator coil 20 is smaller than in the case of the vehicle motor 9. Thus, the pressure loss occurring in the stator ventilating path 42 including the upwind side flow path and the downwind side flow path of the vehicle motor 5 is larger than the pressure loss occurring in the stator ventilating path 42 including the upwind side flow path and the downwind side flow path of the vehicle motor 9. Moreover, in the case in which the overall air flow amounts of the vehicle motor 5 and the vehicle motor 9 are the same, the air flow amount occurring in the vehicle motor 5 stator ventilating path 42 is smaller than the air flow amount occurring in the vehicle motor 9 stator ventilating path 42. However, in the aforementioned manner, in the vehicle motor 5, at locations contacting the stator coil 20, the air flow velocity locally increases, and the surface area of the stator coil 20 contacting the flow of air increases, and thus the heat transfer coefficient occurring at the end portion of the stator coil 20 increases. Due to increase in the heat transfer coefficient occurring at the end portion of the stator coil 20 and the inter-iron core gap 41, cooling performance of the vehicle motor 5 increases.

In the aforementioned manner, according to the vehicle motor 5 according to Embodiment 5 of the present disclosure, the sixth air guiding member 56 and the seventh air guiding member 57 are provided, and thus improvement of cooling performance of the interior of the self-ventilating type vehicle motor 5 is possible.

Embodiment 6

Figure 31:
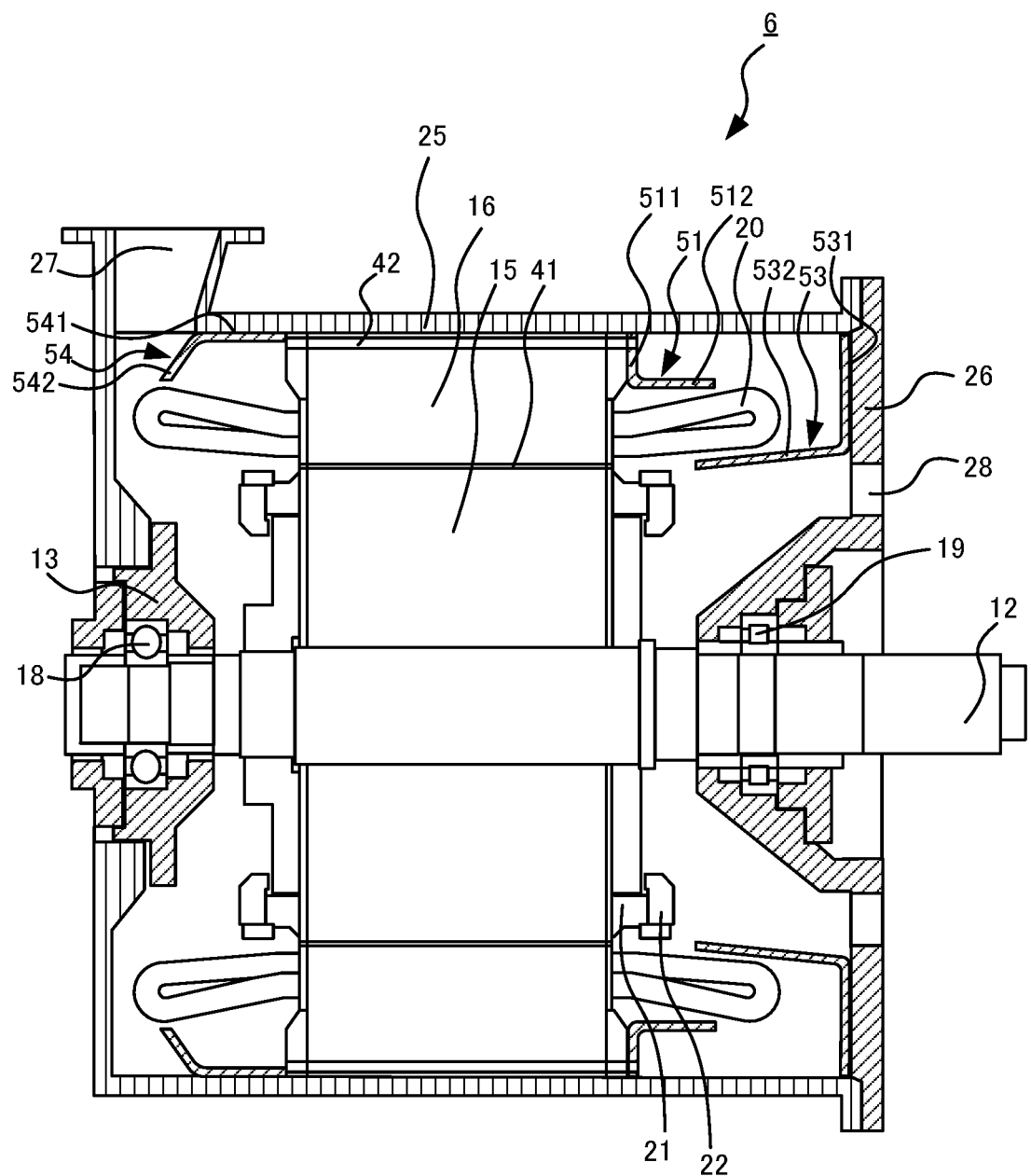
FIG. 31 is a cross-sectional view of a vehicle motor according to Embodiment 6 of the present disclosure.

FIG. 31 is a cross-sectional view of a vehicle motor according to Embodiment 6 of the present disclosure. This drawing is viewed in a manner similar to that of FIG. 1. In addition to the structure of the vehicle motor 2 according to Embodiment 2, a vehicle motor 6 according to Embodiment 6 is further equipped with an upwind side air guiding member that suppresses at least a portion of air flowing in from the suction port 27 from directly arriving at the stator ventilating path 42, and that causes at least a portion of the air flowing in from the suction port 27 to contact the end portion of the stator coil 20 and then to be guided to the stator ventilating path 42. In Embodiment 6, the upwind side air guiding member, in a manner similar to that of the vehicle motor 3, has the fourth air guiding member 54. The fourth air guiding member 54, by the fitting member 541, engages the inner peripheral surface of the frame 25. As illustrated in FIG. 31, the fourth air guiding member 54 extends from the inner peripheral surface of the frame 25 toward the end portion of the stator coil 20. A portion of the outer peripheral surface of the fourth air guiding member 54 is adjacent to the stator core 16 side of the suction port 27. The stator coil opposing member 542 that is the end portion of the fourth air guiding member 54 opposes the outer peripheral surface of the end portion of the stator coil 20. The fourth air guiding member 54 guides the air flowing in from the suction port 27 through the gap between the fourth air guiding member 54 and the surface of the frame 25 perpendicular to the Y axis direction, and guides the air toward the end portion of the stator coil 20. The air contacted with the end portion of the stator coil 20 arrives at the stator ventilating path 42. Due to providing of the fourth air guiding member 54, direct arrival of the air flowing in from the suction port 27 at the stator ventilating path 42 is suppressed.

Figure 32:
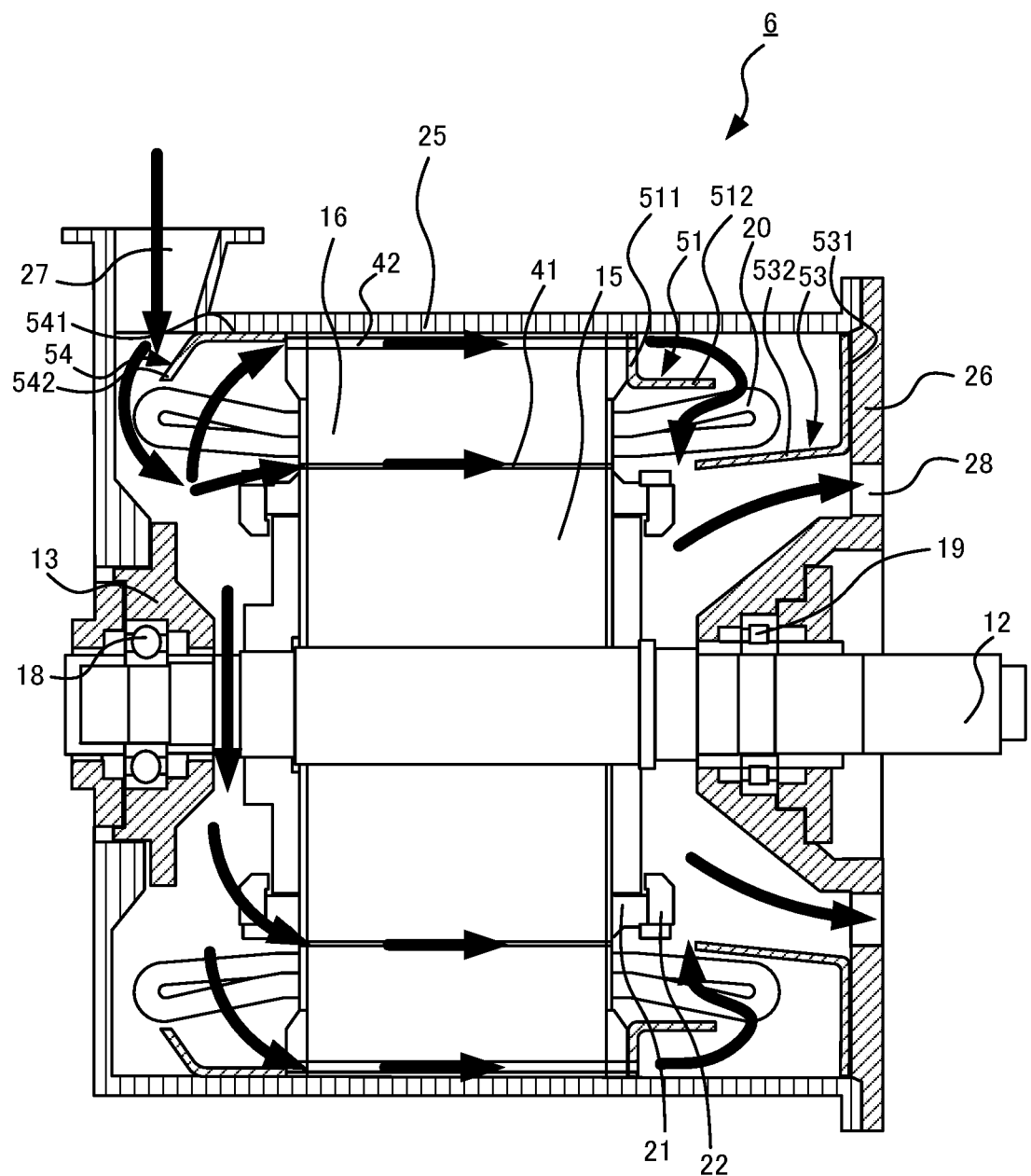
FIG. 32 is a drawing illustrating flow of air occurring in the vehicle motor according to Embodiment 6.

FIG. 32 is a drawing illustrating flow of air occurring in the vehicle motor according to Embodiment 6. This drawing is viewed in a manner similar to that of FIG. 7. The air exterior to the vehicle motor 6 passes through the suction port 27 and flows into the interior of the vehicle motor 6. The air flowing into the interior of the vehicle motor 6 passes between the fourth air guiding member 54 and the surface of the frame 25 perpendicular to the Y axis direction. In a manner similar to that of Embodiment 3, a portion of the air passing between the fourth air guiding member 54 and the surface of the frame 25 perpendicular to the Y axis direction contacts the end portion of the stator coil 20 and arrives at the stator ventilating path 42. The air passing through the stator ventilating path 42, in a manner similar to that of Embodiment 2, passes through the flow path between the cylindrical part 512 of the first air guiding member 51 and the inner peripheral surface of the frame 25, and contacts the end portion of the stator coil 20. Due to providing of the third air guiding member 53, the air contacting the end portion of the stator coil 20 flows along the stator coil 20 and flows toward the stator core 16, and then arrives at the exhaust port 28 and is discharged from the exhaust port 28.

In a manner similar to that of Embodiment 3, the gap between the fourth air guiding member 54 and the stator coil 20 is set less than or equal to a threshold, and thus the fourth air guiding member 54 and the stator coil 20 are made adjacent to each other. Due to providing of the fourth air guiding member 54 and the adjacent location of the fourth air guiding member 54 and the stator coil 20, the air flowing in from the suction port 27 flows in the circumferential direction intervals between the stator coils 20 prior to arriving at the stator ventilating path 42. Thus, the air flow velocity increases locally at the location of contact with the stator coil 20. This increases the heat transfer coefficient occurring at the stator coil 20 increases.

In FIGS. 31 and 32, the vehicle motor 6 has two types of ventilating paths, that is to say, the inter-iron core gap 41 and the stator ventilating path 42. In the vehicle motor 6, in a manner similar to that of the vehicle motor 1 illustrated in FIG. 8, the rotor ventilating path 43 may be formed that extends in the axial direction of the rotor shaft 12 in the rotor core 15. In this case, the vehicle motor 6 has three types of ventilating paths, that is to say, the inter-iron core gap 41, the stator ventilating path 42, and the rotor ventilating path 43. In the case in which the rotor ventilating path 43 is provided, the total surface area of the cross section of the rotor ventilating path 43 perpendicular to the Y axis direction is set within a determined range. The range can be determined in accordance with cooling performance desired for the vehicle motor 6.

Due to equipment of the vehicle motor 6 with the fourth air guiding member 54, the upwind side flow path of the vehicle motor 6 is more complex than the upwind side flow path of the vehicle motor 9. Moreover, in a manner similar to that of Embodiment 2, the downwind side flow path of the vehicle motor 6 is more complex than the downwind side flow path of the vehicle motor 9. For the vehicle motor 6, the upwind side flow path and the downwind side flow path are more complex, and the ventilation cross-sectional area in the vicinity of the end portion of the stator coil 20 of the vehicle motor 6 is smaller than in the case of the vehicle motor 9. Therefore, the pressure loss occurring in the rotor ventilating path 43 and in both the upwind side flow path and the downwind side flow path of the vehicle motor 6 stator ventilating path 42 is larger than the pressure loss occurring in the rotor ventilating path 91 and in both the upwind side flow path and the downwind side flow path of the vehicle motor 9 stator ventilating path 42. Therefore, the air flow amount and the air flow velocity occurring in the inter-iron core gap 41 of the vehicle motor 6 are larger than in the case of the vehicle motor 9. As a result, the heat transfer coefficient occurring in the inter-iron core gap 41 increases. In the vehicle motor 6 illustrated in FIG. 31, the rotor ventilating path 43 is not formed, and thus the heat transfer coefficient occurring in the inter-iron core gap 41 further increases.

In the aforementioned manner, the upwind side flow path and the downwind side flow path of the vehicle motor 6 are more complex than the upwind side flow path and the downwind side flow path of the vehicle motor 9, and the ventilation cross-sectional area in the vicinity of both end portions of the stator coil 20 of the vehicle motor 6 is smaller than in the case of the vehicle motor 9. Therefore, the pressure loss occurring in the stator ventilating path 42 including the upwind side flow path and the downwind side flow path of the vehicle motor 6 is larger than the pressure loss occurring in the stator ventilating path 42 including the upwind side flow path and the downwind side flow path of the vehicle motor 9. In the case in which the overall air flow amounts of the vehicle motor 6 and the vehicle motor 9 are the same, the air flow amount occurring in the stator ventilating path 42 of the vehicle motor 6 is smaller than the air flow amount occurring in the stator ventilating path 42 of the vehicle motor 9. However, as described above, the air flow velocity increases locally at locations of contact with the stator coil 20, and the surface area of the stator coil 20 contacting the flow of the air increases, and thus heat transfer coefficient occurring in the end portion of the stator coil 20 increases. Due to increase in the heat transfer coefficient occurring at the inter-iron core gap 41 and the end portion of the stator coil 20, cooling performance of the vehicle motor 6 increases.

In the aforementioned manner, due to providing of the fourth air guiding member 54 according to the vehicle motor 6 according to Embodiment 6 of the present disclosure, cooling performance of the interior of the forced air-cooled type vehicle motor 6 can be increased.

Embodiment 7

Figure 33:
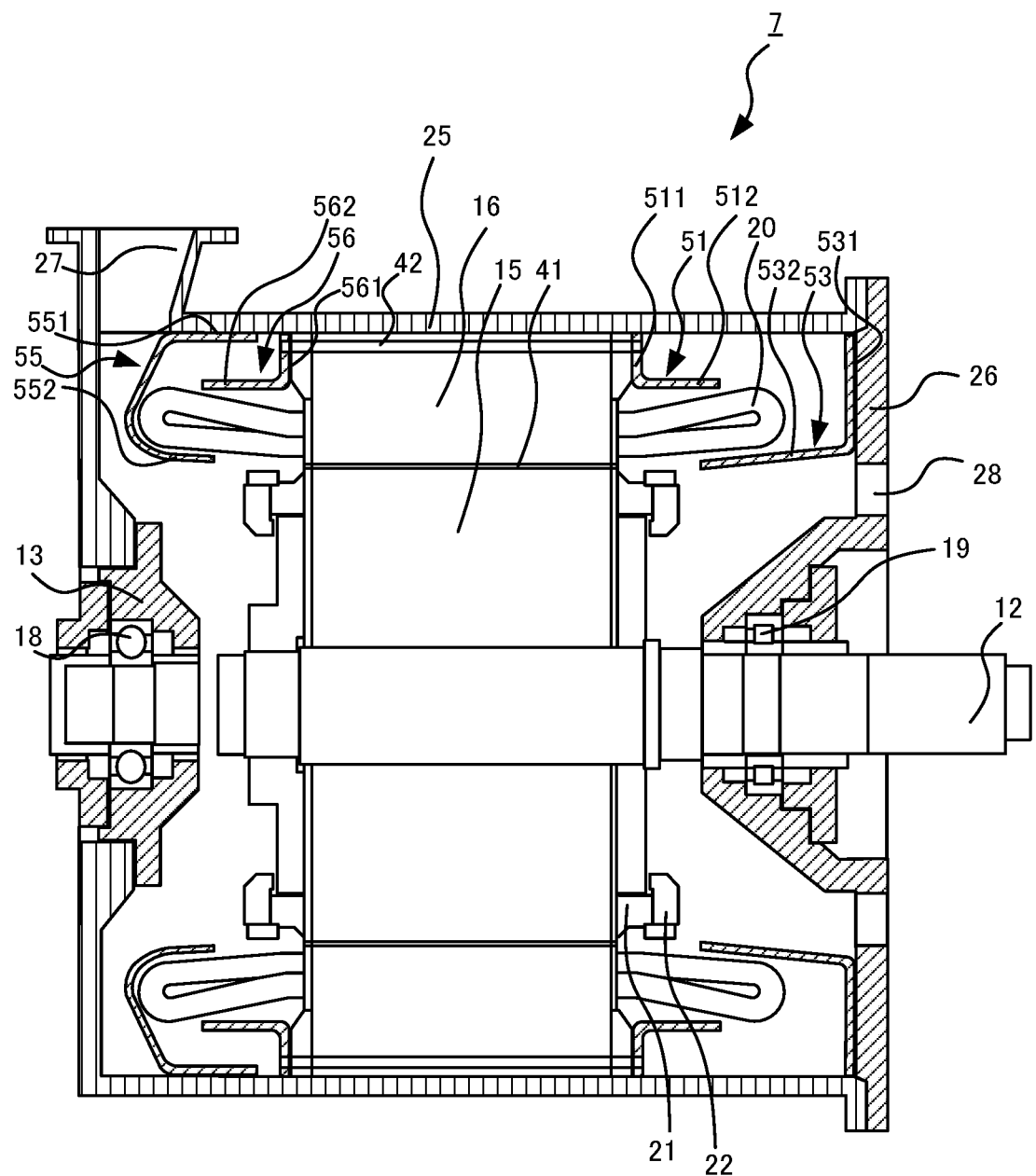
FIG. 33 is a cross-sectional view of a vehicle motor according to Embodiment 7 of the present disclosure.

FIG. 33 is a cross-sectional view of a vehicle motor according to Embodiment 7 of the present disclosure. This drawing is viewed in a manner similar to that of FIG. 1. In addition to the structure of the vehicle motor according to Embodiment 2, a vehicle motor 7 according to Embodiment 7 is further equipped with an upwind side air guiding member that causes at least a portion of air flowing in from the suction port 27 to contact the end portion of the stator coil 20 and guides the air toward the stator ventilating path 42. The upwind side air guiding member, in a manner similar to that of the vehicle motor 4, in Embodiment 7 has the fifth air guiding member 55 and the sixth air guiding member 56. The fifth air guiding member 55 engages the inner peripheral surface of the frame 25 by the fitting member 551. As illustrated in FIG. 33, the fifth air guiding member 55 passes from the inner peripheral surface of the frame 25 through the gap between the end portion of the stator coil 20 and the end portion of the first bracket 13 side of the frame 25, and extends along the end portions of the stator coil 20 toward the stator core 16 through the inner peripheral side of the stator coil 20. A portion of the outer peripheral surface of the fifth air guiding member 55 is adjacent to the stator core 16 side of the suction port 27. The cylindrical part 552 guides toward the stator core 16 at least a portion of the air flowing in from the suction port 27. Moreover, the cylindrical part 552 guides to the end portion of the stator coil 20 the air guided toward the stator core 16. In the aforementioned example, the cross section of the cylindrical part 552 perpendicular to the Y axis direction becomes smaller in the Y axis direction toward the stator core 16. By changing size of the cross section of the cylindrical part 552 perpendicular to the Y axis in accordance with the slope of the inner peripheral surface of the stator coil 20, the fifth air guiding member 55 and the stator coil 20 can be brought close to each other. Further, the size of the cross section of the cylindrical part 552 perpendicular to the Y axis may be constant.

Figure 34:
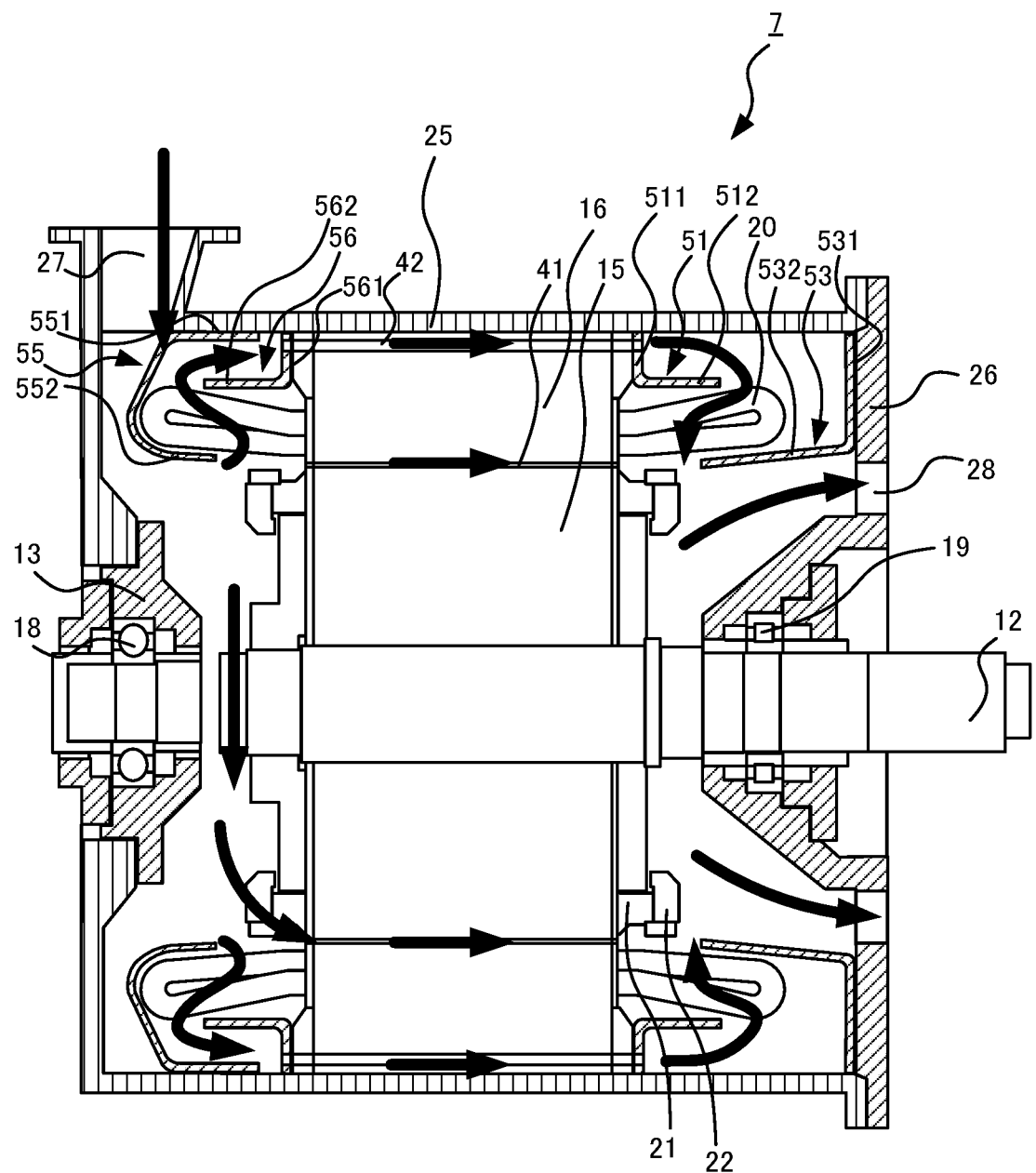
FIG. 34 is a drawing illustrating flow of air occurring in the vehicle motor according to Embodiment 7.

FIG. 34 is a drawing illustrating flow of air occurring in the vehicle motor according to Embodiment 7. This drawing is viewed in a manner similar to that of FIG. 7. The air exterior to the vehicle motor 7 flows into the interior of the vehicle motor 7 via the suction port 27. The air flowing into the interior of the vehicle motor 7, in a manner similar to that of Embodiment 4, passes through the gap between the surface of the frame 25 perpendicular to the Y axis direction and the fifth air guiding member 55. A portion of the air flowing through the gap between the surface of the frame 25 perpendicular to the Y axis direction and the fifth air guiding member 55 flows along the fifth air guiding member 55 and toward the direction of the stator core 16, through the gap between the outer peripheral surface of the cylindrical part 552 of the fifth air guiding member 55 and the inner peripheral surface of the sixth air guiding member 56, and then flows from the stator core 16 side toward the end portion of the stator coil 20. The air contacting the end portion of the stator coil 20 passes through the gap between the outer peripheral surface of the sixth air guiding member 56 and the inner peripheral surface of the frame 25, and arrives at the stator ventilating path 42. The air passing through the stator ventilating path 42, in a manner similar to that of Embodiment 2, passes through the flow path between the cylindrical part 512 of the first air guiding member 51 and the inner peripheral surface of the frame 25, and contacts the end portion of the stator coil 20. Due to providing of the third air guiding member 53, the air contacting the end portion of the stator coil 20, after flowing along the stator coil 20 and toward the stator core 16, arrives at the exhaust port 28 and is discharged from the exhaust port 28.

Due to providing of the fifth air guiding member 55 and the sixth air guiding member 56, the air flowing in from the suction port 27, prior to arriving at the stator ventilating path 42, flows toward the end portion of the stator coil 20 from the stator core 16 side, and then passes through the flow path between the cylindrical part 562 of the sixth air guiding member 56 at the outer peripheral side of the stator coil 20 and the cylindrical part 552 of the fifth air guiding member 55 at the inner peripheral side. Therefore, the distance of the flow path through which air flows while contacting the stator coil 20 is longer than in the case of the vehicle motor 9. In the vehicle motor 7 according to Embodiment 7, air flows between the sixth air guiding member 56 and the fifth air guiding member 55 at the upwind side, in the same manner as the downwind side, and thus the air flow velocity increases locally at locations of contact with the stator coil 20. Moreover, the distance through which air flows while contacting the stator coil 20 increases, and thus the surface area of the stator coil 20 contacting the flow of air increases. Therefore, the heat transfer coefficient occurring at the stator coil 20 increases.

In FIGS. 33 and 34, the vehicle motor 7 has two types of ventilating paths, that is to say, the inter-iron core gap 41 and the stator ventilating path 42. For the vehicle motor 7 in a manner similar to that of the vehicle motor 1 illustrated in FIG. 8, the rotor ventilating path 43 extending in the axial direction of the rotor shaft 12 may be formed in the rotor core 15. In this case, the vehicle motor 7 has three types of ventilating paths, that is to say, the inter-iron core gap 41, the stator ventilating path 42, and the rotor ventilating path 43. In the case in which the rotor ventilating path 43 is provided, the total surface area of the cross section of the rotor ventilating path 43 perpendicular to the Y axis direction is set within a determined range. The range can be set in accordance to cooling performance desired for the vehicle motor 7.

Due to equipping of the vehicle motor 7 with the fifth air guiding member 55 and the sixth air guiding member 56, the upwind side flow path of the vehicle motor 7 is more complex than the upwind side flow path of the vehicle motor 9. Moreover, in a manner similar to that of Embodiment 2, the downwind side flow path of the vehicle motor 7 is more complex than the downwind side flow path of the vehicle motor 9. The vehicle motor 7 has the upwind side flow path and the downwind side flow path that are more complex, and the ventilation cross-sectional area in the vicinity of the end portion of the stator coil 20 of the vehicle motor 7 is smaller than in the case of the vehicle motor 9. Therefore, the pressure loss occurring in the rotor ventilating path 43 and in the upwind side flow path and the downwind side flow path at both sides of the stator ventilating path 42 of the vehicle motor 7 is greater than the pressure loss occurring in the rotor ventilating path 91 and in the upwind side flow path and the downwind side flow path at both sides of the stator ventilating path 42 of the vehicle motor 9. Therefore, the air flow amount and the air flow velocity occurring in the inter-iron core gap 41 of the vehicle motor 7 are larger than in the case of the vehicle motor 9. As a result, the heat transfer coefficient occurring in the inter-iron core gap 41 increases. In the vehicle motor 7 illustrated in FIG. 33, the rotor ventilating path 43 is not formed, and thus the heat transfer coefficient occurring in the inter-iron core gap 41 further increases.

In the aforementioned manner, the upwind side flow path and the downwind side flow path of the vehicle motor 7 are more complex than the upwind side flow path and the downwind side flow path of the vehicle motor 9, and the ventilation cross-sectional area in the vicinity of both end portions of the stator coil 20 of the vehicle motor 7 is smaller than in the case of the vehicle motor 9. Therefore, the pressure loss occurring in the stator ventilating path 42 including the upwind side flow path and the downwind side flow path of the vehicle motor 7 is larger than the pressure loss occurring in the stator ventilating path 42 including the upwind side flow path and the downwind side flow path of the vehicle motor 9. Moreover, in the case in which the overall air flow amounts of the vehicle motor 7 and the vehicle motor 9 are the same, the air flow amount occurring in the stator ventilating path 42 of the vehicle motor 7 is smaller than the air flow amount occurring in the stator ventilating path 42 of the vehicle motor 9. However, as described above, due to increase in the air flow velocity locally at locations of contact with the stator coil 20 in the vehicle motor 7, and due to the increase in surface area of the stator coil 20 contacting the flow of air, the heat transfer coefficient occurring at the end portion of the stator coil 20 increases. Due to increase in the heat transfer coefficient occurring at the inter-iron core gap 41 and the end portion of the stator coil 20, cooling performance of the vehicle motor 7 increases.

In the aforementioned manner, according to the vehicle motor 7 according to Embodiment 7 of the present disclosure, due to providing of the fifth air guiding member 55 and the sixth air guiding member 56, cooling performance of the interior of the forced air-cooled type vehicle motor 7 can be improved.

The present disclosure is not limited to the aforementioned embodiments. In the aforementioned examples, although one end of the rotor shaft 12 in the vicinity of the exhaust ports 24 and 28 is located on the drive side, the orientation of the rotor shaft 12 may be reversed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5, 6, 7, 9 Vehicle motor
11, 25, 29 Frame
12 Rotor shaft
13 First bracket
14, 26 Second bracket
15 Rotor core
16 Stator core
17, 92 Fan
18, 19 Bearing
20 Stator coil
21 Rotor bar
22 Short-circuit ring
23, 27, 30 Suction port
24, 28 Exhaust port
41 Inter-iron core gap
42 Stator ventilating path
43, 91 Rotor ventilating path
51 First air guiding member
52 Second air guiding member
53 Third air guiding member
54 Fourth air guiding member
55 Fifth air guiding member
56 Sixth air guiding member
57 Seventh air guiding member
93 Partition plate
171, 921 Shaft-fitting member
172, 922 Main plate
173, 923 Blade
174, 924 Side plate
511, 531, 561, 571 Fastening member
512, 532, 552, 562, 572 Cylindrical part
521, 541, 551, 561 Fitting member
522 Side plate opposing member
542 Stator coil opposing member

The invention claimed is:

1. A vehicle motor comprising:
a frame to be fixed to a vehicle;
a rotor shaft accommodated by the frame;
a rotor core engaging the rotor shaft to integrally rotate with the rotor shaft;
a rotor conductor held by the rotor core;
a stator core opposing an outer peripheral surface of the rotor core with a gap therebetween, and attached to an inner peripheral surface of the frame, the stator core having stator ventilating paths, the stator ventilating paths extending in an axial direction of the rotor shaft;
a stator coil held by the stator core further at an inner periphery side than the stator ventilating paths in a state in which both end portions of the stator coil protrude from the stator core in the axial direction of the rotor shaft;
a first bracket and a second bracket opposing each other in the axial direction of the rotor shaft and sandwiching therebetween the rotor core and the stator core, each bracket holding a bearing rotatably supporting the rotor shaft and attached to the frame; and
a plurality of downwind side air guiding members to cause air, upon flowing in from a suction port formed in an end portion of the frame at a first bracket side and passes through the stator ventilating paths, to contact one of the end portions of the stator coil, then be guided from the end portion of the stator coil toward the stator core along the stator coil, and thereafter be guided to an exhaust port formed in the second bracket or in an end portion of the frame at a second bracket side.

2. The vehicle motor according to claim 1, further comprising:
a fan attached to the rotor shaft between the second bracket and the rotor core to integrally rotate with the rotor shaft, wherein
the exhaust port is formed in the end portion of the frame at the second bracket side opposing the fan;
each of the downwind side air guiding members comprises:
a first air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and
a second air guiding member (i) having an annular shape in a cross section perpendicular to the axial direction of the rotor shaft, (ii) having an outer peripheral surface contacting the inner peripheral surface of the frame, and (iii) extending from an inner peripheral surface of the frame toward an end portion in a vicinity of the exhaust port of a side plate that is an outer peripheral surface of the fan, a portion of the outer peripheral surface of the second air guiding member being adjacent to a stator core side of the exhaust port, and
a portion of the side plate opposes a portion of the cylindrical part of the first air guiding member with the stator coil being sandwiched therebetween.

3. The vehicle motor according to claim 2, further comprising:
an upwind side air guiding member to cause contact of at least a portion of the air flowing in from the suction port with the end portion of the stator coil, and guide the contacted air to the stator ventilating paths.

4. The vehicle motor according to claim 3, wherein
the suction port is formed in the end portion of the frame at the first bracket side opposing an outer peripheral surface of the first bracket, and
the upwind side air guiding member is a fourth air guiding member that (i) has an annular or partial annular shape in cross section perpendicular to the axial direction of the rotor shaft, (ii) has an outer peripheral surface contacting an inner peripheral surface of the frame, a portion of the outer peripheral surface abutting against the stator core side of the suction port, and (iii) extends from the inner peripheral surface of the frame toward the end portion of the stator coil.

5. The vehicle motor according to claim 4, wherein
the fourth air guiding member has a partial annular shape in cross section perpendicular to the axial direction of the rotor shaft, and
a plane passing through (i) a centroid of the partial annular shape and (ii) the axis of the rotor shaft passes through the suction port.

6. The vehicle motor according to claim 3, wherein
the suction port is formed in the end portion of the frame at the first bracket side opposing an outer peripheral surface of the first bracket,
the upwind side air guiding member comprises:
 a fifth air guiding member having (i) an annular or partial annular shape in cross section perpendicular to the axial direction of the rotor shaft, (ii) an outer peripheral surface contacting an inner peripheral surface of the frame, a portion of the outer peripheral surface abutting against the stator core side of the suction port, and (iii) a cylindrical part passing from the inner peripheral surface of the frame through a gap between the end portion of the stator coil and an end portion of the frame of the first bracket side perpendicular to the axial direction of the rotor shaft, and extending toward the stator core along the end portion of the stator coil at an inner peripheral side of the stator coil, and
 a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and
 a portion of the cylindrical part of the fifth air guiding member opposes a portion of the cylindrical part of the sixth air guiding member with the stator coil being sandwiched therebetween.

7. The vehicle motor according to claim 6, wherein
the fifth air guiding member has a partial annular shape in cross section perpendicular to the axial direction of the rotor shaft, and
a plane passing through (i) a centroid of the partial annular shape and (ii) the axis of the rotor shaft passes through the suction port.

8. The vehicle motor according to claim 3, wherein
the suction port is formed in the end portion of the frame at the first bracket side perpendicular to the axial direction of the rotor shaft,
the upwind side air guiding member comprises:
 a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and
 a seventh air guiding member having (i) an annular shape in cross section perpendicular to the axial direction of the rotor shaft, (ii) one end portion in the axial direction of the rotor shaft contacting an end portion of the frame at a first bracket side perpendicular to the axial direction of the rotor shaft, and (iii) a cylindrical part extending from the one end portion along the stator coil at an inner peripheral side of the stator coil, a portion of the one end portion in the axial direction of the rotor shaft abutting against an outer peripheral side of the suction port, and
 a portion of the cylindrical part of the seventh air guiding member opposes a portion of the cylindrical part of the sixth air guiding member with the stator coil being sandwiched therebetween.

9. The vehicle motor according to claim 1, wherein
the exhaust port is formed in the second bracket,
each of the downwind side air guiding members comprises:
 a first air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and
 a third guiding member having (i) an annular shape in a cross section perpendicular to the axial direction of the rotor shaft, (ii) one end portion in the axial direction of the rotor shaft contacting the second bracket, a portion of the end portion being adjacent to an outer peripheral side of the exhaust port, and (iii) a cylindrical part extending in the axial direction of the rotor shaft, and
 a portion of the cylindrical part of the third air guiding member opposes a portion of the cylindrical part of the first air guiding member with the stator coil being sandwiched therebetween.

10. The vehicle motor according to claim 9, further comprising:
an upwind side air guiding member to cause contact of at least a portion of the air flowing in from the suction port with the end portion of the stator coil, and guide the contacted air to the stator ventilating paths.

11. The vehicle motor according to claim 10, wherein
the suction port is formed in the end portion of the frame at the first bracket side opposing an outer peripheral surface of the first bracket, and
the upwind side air guiding member is a fourth air guiding member that (i) has an annular or partial annular shape in cross section perpendicular to the axial direction of the rotor shaft, (ii) has an outer peripheral surface contacting an inner peripheral surface of the frame, a portion of the outer peripheral surface abutting against the stator core side of the suction port, and (iii) extends from the inner peripheral surface of the frame toward the end portion of the stator coil.

12. The vehicle motor according to claim 10, wherein
the suction port is formed in the end portion of the frame at the first bracket side opposing an outer peripheral surface of the first bracket,
the upwind side air guiding member comprises:
 a fifth air guiding member having (i) an annular or partial annular shape in cross section perpendicular to the axial direction of the rotor shaft, (ii) an outer peripheral surface contacting an inner peripheral surface of the frame, a portion of the outer peripheral surface abutting against the stator core side of the suction port, and (iii) a cylindrical part passing from the inner peripheral surface of the frame through a gap between the end portion of the stator coil and an end portion of the frame of the first bracket side perpendicular to the axial direction of the rotor shaft, and extending toward the stator core along the end portion of the stator coil at an inner peripheral side of the stator coil, and a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and a portion of the cylindrical part of the fifth air guiding member opposes a portion of the cylindrical part of the sixth air guiding member with the stator coil being sandwiched therebetween.

13. The vehicle motor according to claim 10, wherein the suction port is formed in the end portion of the frame at the first bracket side perpendicular to the axial direction of the rotor shaft, the upwind side air guiding member comprises:

a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and a seventh air guiding member having (i) an annular shape in cross section perpendicular to the axial direction of the rotor shaft, (ii) one end portion in the axial direction of the rotor shaft contacting an end portion of the frame at a first bracket side perpendicular to the axial direction of the rotor shaft, and (iii) a cylindrical part extending from the one end portion along the stator coil at an inner peripheral side of the stator coil, a portion of the one end portion in the axial direction of the rotor shaft abutting against an outer peripheral side of the suction port, and a portion of the cylindrical part of the seventh air guiding member opposes a portion of the cylindrical part of the sixth air guiding member with the stator coil being sandwiched therebetween.

14. The vehicle motor according to claim 1, further comprising:

an upwind side air guiding member to cause contact of at least a portion of the air flowing in from the suction port with the end portion of the stator coil, and guide the contacted air to the stator ventilating paths.

15. The vehicle motor according to claim 14, wherein the suction port is formed in the end portion of the frame at the first bracket side opposing an outer peripheral surface of the first bracket, and the upwind side air guiding member is a fourth air guiding member that (i) has an annular or partial annular shape in cross section perpendicular to the axial direction of the rotor shaft, (ii) has an outer peripheral surface contacting an inner peripheral surface of the frame, a portion of the outer peripheral surface abutting against the stator core side of the suction port, and (iii) extends from the inner peripheral surface of the frame toward the end portion of the stator coil.

16. The vehicle motor according to claim 15, wherein the fourth air guiding member has a partial annular shape in cross section perpendicular to the axial direction of the rotor shaft, and a plane passing through (i) a centroid of the partial annular shape and (ii) the axis of the rotor shaft passes through the suction port.

17. The vehicle motor according to claim 14, wherein the suction port is formed in the end portion of the frame at the first bracket side opposing an outer peripheral surface of the first bracket, the upwind side air guiding member comprises:

a fifth air guiding member having (i) an annular or partial annular shape in cross section perpendicular to the axial direction of the rotor shaft, (ii) an outer peripheral surface contacting an inner peripheral surface of the frame, a portion of the outer peripheral surface abutting against the stator core side of the suction port, and (iii) a cylindrical part passing from the inner peripheral surface of the frame through a gap between the end portion of the stator coil and an end portion of the frame of the first bracket side perpendicular to the axial direction of the rotor shaft, and extending toward the stator core along the end portion of the stator coil at an inner peripheral side of the stator coil, and a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and a portion of the cylindrical part of the fifth air guiding member opposes a portion of the cylindrical part of the sixth air guiding member with the stator coil being sandwiched therebetween.

18. The vehicle motor according to claim 17, wherein the fifth air guiding member has a partial annular shape in cross section perpendicular to the axial direction of the rotor shaft, and a plane passing through (i) a centroid of the partial annular shape and (ii) the axis of the rotor shaft passes through the suction port.

19. The vehicle motor according to claim 14, wherein the suction port is formed in the end portion of the frame at the first bracket side perpendicular to the axial direction of the rotor shaft, the upwind side air guiding member comprises:

a sixth air guiding member having (i) an annular shape in a cross section perpendicular to the axial direction of the rotor shaft, (ii) one end portion in the axial direction of the rotor shaft contacting the stator core, and (iii) a cylindrical part extending in the axial direction of the rotor shaft, and a seventh air guiding member having (i) an annular shape in cross section perpendicular to the axial direction of the rotor shaft, (ii) one end portion in the axial direction of the rotor shaft contacting an end portion of the frame at a first bracket side perpendicular to the axial direction of the rotor shaft, and (iii) a cylindrical part extending from the one end portion along the stator coil at an inner peripheral side of the stator coil, a portion of the one end portion in the axial direction of the rotor shaft abutting against an outer peripheral side of the suction port, and a portion of the cylindrical part of the seventh air guiding member opposes a portion of the cylindrical part of the sixth air guiding member with the stator coil being sandwiched therebetween.

20. The vehicle motor according to claim 1, wherein
a rotor ventilating path extending in the axial direction of the rotor shaft is formed in the rotor core, and
a total surface area of a cross section of the rotor ventilating path perpendicular to the axial direction of the rotor shaft is within a determined range.

* * * * *